(12) United States Patent
Tsuruta et al.

(10) Patent No.: US 8,254,636 B2
(45) Date of Patent: Aug. 28, 2012

(54) IMAGE PROCESSING APPARATUS AND IMAGE PROCESSING METHOD

(75) Inventors: Toru Tsuruta, Kawasaki (JP);
Masayoshi Shimizu, Kawasaki (JP);
Yuushi Toyoda, Kawasaki (JP); Eishi Morimatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 240 days.

(21) Appl. No.: 12/767,376

(22) Filed: Apr. 26, 2010

(65) Prior Publication Data
US 2010/0202712 A1 Aug. 12, 2010

Related U.S. Application Data

(63) Continuation of application No. PCT/JP2008/054640, filed on Mar. 13, 2008.

(30) Foreign Application Priority Data

Nov. 6, 2007 (WO) .................. PCT/JP2007/071577

(51) Int. Cl.
*G06K 9/00* (2006.01)
*G06K 9/40* (2006.01)
(52) U.S. Cl. .................. 382/103; 382/245; 382/264
(58) Field of Classification Search .................. 382/103, 382/130, 219–221
See application file for complete search history.

(56) References Cited

U.S. PATENT DOCUMENTS

| 4,409,623 A | 10/1983 | Kobayashi et al. |
| 5,490,221 A * | 2/1996 | Ransford et al. .............. 382/130 |
| 2004/0190788 A1 | 9/2004 | Imafuku et al. |

FOREIGN PATENT DOCUMENTS

| JP | 57-127364 | 8/1982 |
| JP | 2004-221645 | 8/2004 |
| JP | 2004-303075 | 10/2004 |

* cited by examiner

*Primary Examiner* — Alex Liew
(74) *Attorney, Agent, or Firm* — Greer, Burns & Crain, Ltd.

(57) ABSTRACT

An image processing apparatus holds a plurality of intermediate smoothed images smoothed at a plurality of preset level values, reduces the N-th frame image of a moving image received from the outside to generate a reduced image, performs a smoothing process on the generated reduced image at the plurality of preset level values to generate a plurality of intermediate smoothed images, stores the generated intermediate smoothed images in an intermediate smoothed image storing unit, acquires, when generating the smoothed images of the frames after the (N+1)-th frame, one or a plurality of intermediate smoothed images from the plurality of intermediate smoothed images of the N-th frame stored in the intermediate smoothed image storing unit, synthesizes the acquired intermediate smoothed images of the N-th frame and the frames after the (N+1)-th frame of the moving image received from the outside, and generates smoothed images.

9 Claims, 11 Drawing Sheets

IMAGE PROCESSING APPARATUS AND IMAGE PROCESSING METHOD

CROSS-REFERENCE TO RELATED APPLICATION(S)

This application is a continuation of International Application No. PCT/JP2008/054640, filed on Mar. 13, 2008 which claims the benefit of priority from International Application No. PCT/JP2007/071577, filed on Nov. 6, 2007, the entire contents of which are incorporated herein by reference.

FIELD

The embodiments discussed herein are directed to an image processing apparatus that generates a smoothed image from a moving image consisting of a plurality of frames accepted from the outside by using a low frequency component.

BACKGROUND

In the field of a smoothing process for smoothing image data to obtain easily viewable image data, an LPF (Low Pass Filter) that is a filter for passing only a low-pass frequency has been conventionally utilized. In general, when an LPF process is performed, it is necessary to hold pixels in a smoothing range and thus to prepare a memory that has a capacity for the number of lines required to hold the pixels as illustrated in FIG. 12A. For example, in FIG. 12A, because pixels in the range of a gray part should be held with respect to target pixels, the number of lines depicted by thick arrows is stored in a memory. Therefore, a memory having a large capacity is required.

In recent years, a technology for reducing a memory capacity necessary for holding pixels within a smoothing process range has been known as disclosed in, for example, Japanese Laid-open Patent Publication No. 2004-221645. As illustrated in FIG. 12B, according to this technology, a reduced image obtained by reducing an image before one frame is held and a smoothing process is performed by using the reduced image. When the reduction rate of the reduced images is adequately small, the smoothing process can be performed by a memory that has a capacity smaller than a memory that has a capacity for the number of lines as described above.

However, there is a problem in that edges cannot be accurately reproduced by the LPF process in the conventional art. Specifically, because the fine information of an image is lost by an image reduction process, edges cannot be accurately reproduced.

SUMMARY

According to an aspect of an embodiment of the invention, an image processing apparatus for generating a smoothed image from a moving image that consists of a plurality of received frames by using a low frequency component includes an intermediate smoothed image holding unit that holds a plurality of intermediate smoothed images that are smoothed at a plurality of preset level values; an image reduction processing unit that generates a reduced image by reducing an N-th frame image of the received moving image; an intermediate smoothed image generating unit that generates the plurality of intermediate smoothed images by performing a smoothing process on the reduced image generated by the image reduction processing unit at the plurality of preset level values, and stores the generated intermediate smoothed images in the intermediate smoothed image holding unit; an acquiring unit that acquires, when generating smoothed images of frames after an (N+1)-th frame, one intermediate smoothed image or a plurality of intermediate smoothed images from the plurality of intermediate smoothed images of the N-th frame held in the intermediate smoothed image holding unit; and a synthesis processing unit that generates smoothed images by synthesizing the intermediate smoothed images of the N-th frame acquired by the acquiring unit and the frames after the (N+1)-th frame of the received moving image.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. The present invention is not limited to the embodiments explained below. Hereinafter, it will be sequentially explained about the brief and special feature of an image processing apparatus and the configuration and process flow of the image processing apparatus according to a first embodiment. Finally, it will be explained about effects caused by the present embodiment.

[a] First Embodiment

Brief and Special Feature of Image Processing Apparatus

Figure 1:
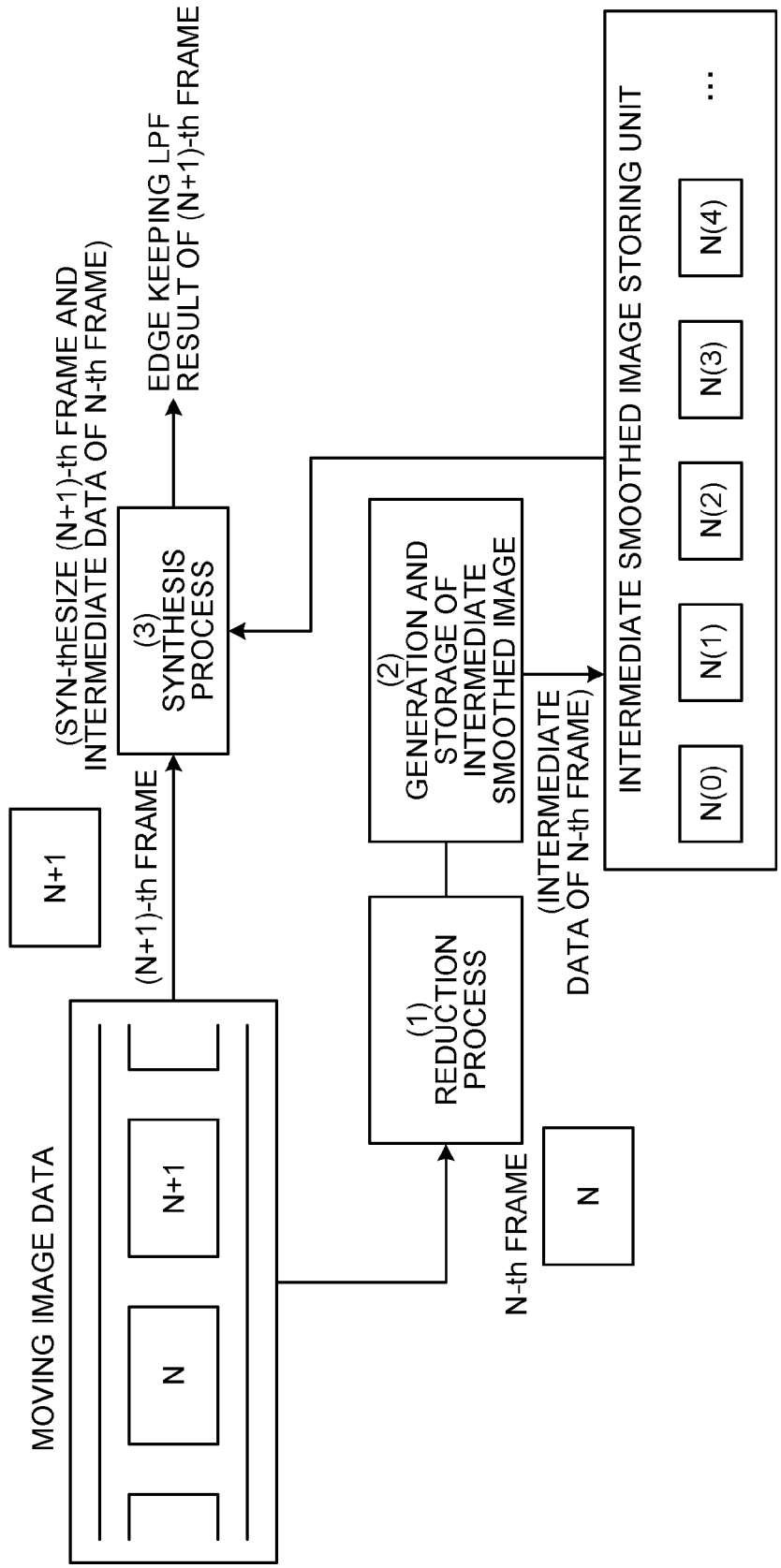
FIG. 1 is a diagram illustrating the brief and special feature of an image processing apparatus according to a first embodiment.

Next, it will be explained about the brief and special feature of an image processing apparatus according to the first embodiment. FIG. 1 is a diagram illustrating the brief and special feature of the image processing apparatus according to the first embodiment.

The image processing apparatus is an LPF (Low Pass Filter) that receives the frame of a moving image every 1/30 second and performs a noise rejection process or a dynamic range correction process on the frame. The image processing apparatus generates a smoothed image from the frame of the received moving image. In this case, a processing target is a Y component (brightness component) of YCbCr components. However, another component may be a processing target. Of course, the image processing apparatus can be applied to an image depicted by other color coordinate systems (RGB).

In such a configuration, the image processing apparatus generates a smoothed image from a moving image that consists of a plurality of frames received from the outside by using the low frequency component of the frame. Particularly, the image processing apparatus has the characteristics that a memory capacity necessary for an LPF process can be reduced and edges can be accurately reproduced.

It is explained about the main characteristics. The image processing apparatus reduces the N-th frame image of the moving image received from the outside and generates a reduced image (see (1) of FIG. 1). Specifically, as an example, when receiving the N-th frame of moving image data from the outside, the image processing apparatus performs a reduction process for reducing the N-th frame of the moving image data received from the outside to generate a reduced image.

Then, the image processing apparatus performs a smoothing process on the generated reduced image at a plurality of preset level values to generate a plurality of intermediate smoothed images and stores the intermediate smoothed images in an intermediate smoothed image storing unit (see (2) of FIG. 1). It is specifically explained about the above-described example. The image processing apparatus performs a plurality of smoothing processes corresponding to the ranges of level values previously multilayered by five planes (images) on the reduced image of the generated N-th frame at the levels of brightness of 0 to 255 gradations and generates the plurality of intermediate smoothed images (N(0) to N(4)) that becomes intermediate data in the smoothing processes performed by the image processing apparatus. Then, the image processing apparatus stores the generated intermediate smoothed images in the intermediate smoothed image storing unit.

Next, when generating the smoothed images of frames after the (N+1)-th frame, the image processing apparatus acquires one intermediate smoothed image or a plurality of intermediate smoothed images from the plurality of intermediate smoothed images of the N-th frame stored in the intermediate smoothed image storing unit and synthesizes the acquired intermediate smoothed images of the N-th frame and the frames after the (N+1)-th frame of the moving image received from the outside to generate smoothed images (see (3) of FIG. 1).

It is specifically explained about the above-described example. When generating the smoothed images of frames after the (N+1)-th frame, the image processing apparatus acquires one intermediate smoothed image or a plurality of intermediate smoothed images from the five intermediate smoothed images (N(0) to N(4)) of the N-th frame stored in the intermediate smoothed image storing unit. Then, the image processing apparatus synthesizes the acquired intermediate smoothed images (N(0) to N(4)) of the N-th frame and the frames after the (N+1)-th frame of the moving image received from the outside to generate smoothed images. In this case, the frames after the (N+1)-th frame mean a plurality of frames, such as the (N+1)-th frame and the (N+2)-th frame, constituting a moving image that is input from the outside and becomes a processing target. Moreover, one or all of N(0) to N(4) may be utilized as intermediate smoothed images of the N-th frame that are utilized for synthesis.

In other words, when generating a smoothed image of the (N+1)-th frame, the (N+2)-th frame, or the like, the image processing apparatus uses one intermediate smoothed image or the plurality of intermediate smoothed images of the reduced N-th frame to generate a smoothed image. Moreover, when synthesizing one intermediate smoothed image or the plurality of intermediate smoothed images of the N-th frame and the frames after the (N+1)-th frame that become a processing target, the image processing apparatus synthesizes the images while acquiring fine information such as edges that cannot be held by the reduced intermediate smoothed image from the frames after the (N+1)-th frame that become a processing target. As a result of the synthesis process, the image processing apparatus obtains the result of the smoothing process in which the edges of the target frames after the (N+1)-th frame are held. The obtained image data is utilized by a dynamic range correction process or the like.

In this way, the image processing apparatus according to the first embodiment can utilize the reduced past frame for synthesis with a plurality of processing target frames. As a result, the image processing apparatus can reduce a memory capacity that is necessary for an LPF process and can accurately reproduce edges.

Configuration of Image Processing Apparatus

Figure 2:
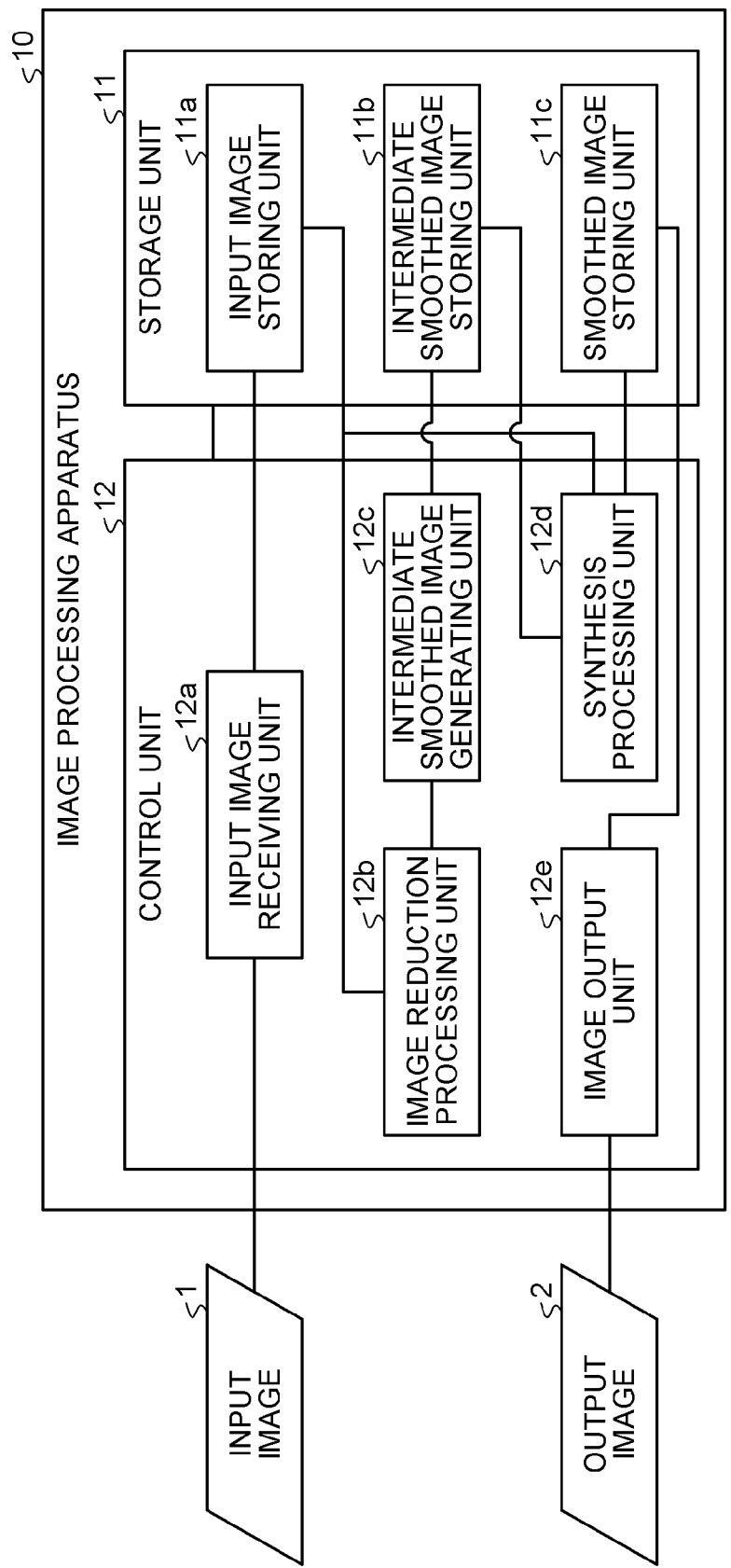
FIG. 2 is a block diagram illustrating the configuration of the image processing apparatus according to the first embodiment.

Next, it will be explained about the configuration of an image processing apparatus according to the first embodiment with reference to FIG. 2. FIG. 2 is a block diagram illustrating the configuration of an image processing apparatus 10 according to the first embodiment. As illustrated in FIG. 2, the image processing apparatus 10 includes a storage unit 11 and a control unit 12. The image processing apparatus 10 performs a smoothing process on an input image 1 that is one of a plurality of frames of a moving image received from the outside and outputs the processed result as an output image 2 that can be used for a dynamic range correction process or the like.

The storage unit 11 stores data required for various types of processes performed by the control unit 12 and various types of processing results performed by the control unit 12. Particularly, as units closely relevant to the present invention, the storage unit 11 includes an input image storing unit 11a, an intermediate smoothed image storing unit 11b, and a smoothed image storing unit 11c.

Figure 3:
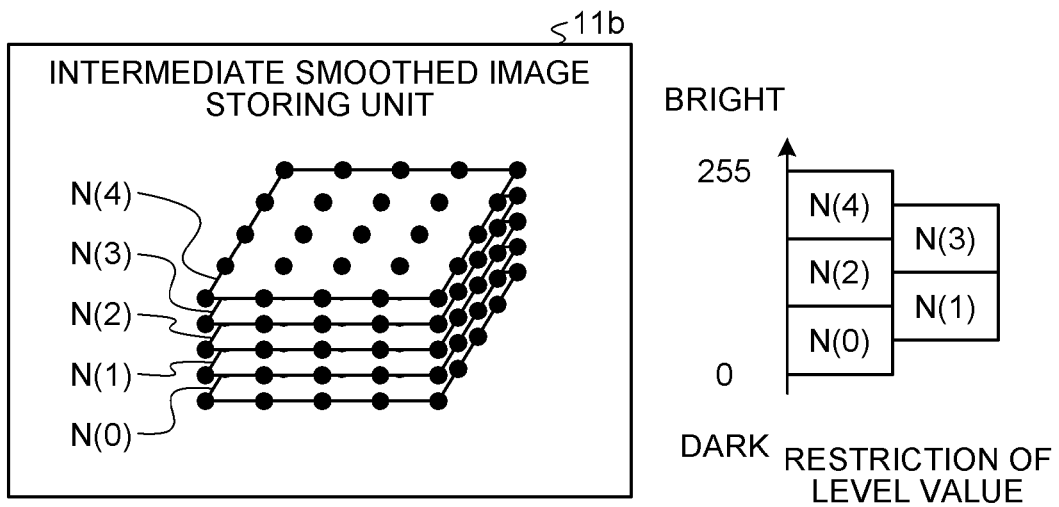
FIG. 3 is a diagram illustrating an example of information stored in an intermediate smoothed image storing unit.

The input image storing unit 11a stores the input image 1 that is the frame of the moving image that is input into the image processing apparatus 10 from the outside. Moreover, as illustrated in FIG. 3, the intermediate smoothed image storing unit 11b stores a plurality of intermediate smoothed images (N(0) to N(4)) that is generated by an intermediate smoothed image generating unit 12c to be described below and is smoothed by a plurality of preset level values at the levels of brightness of 0 to 255 gradations. Moreover, the smoothed image storing unit 11c stores a smoothed image that is obtained by being synthesized by a synthesis processing unit 12d to be described below. FIG. 3 is a diagram illustrating an example of information stored in the intermediate smoothed image storing unit 11b.

The control unit 12 has an internal memory that stores a control program, a program that defines various types of processing procedures, and required data. Particularly, as units closely relevant to the present invention, the control unit 12 includes an input image receiving unit 12a, an image reduction processing unit 12b, the intermediate smoothed image generating unit 12c, the synthesis processing unit 12d, and an image output unit 12e and carries out various processes by using these.

The input image receiving unit 12a receives an input image that is the frame of a moving image that is input into the image processing apparatus 10 from the outside. As a specific example, the input image receiving unit 12a receives the input image 1 that is the N-th frame of moving image data that is input into the image processing apparatus 10 from the outside and stores the received input image 1 in the input image storing unit 11a.

The image reduction processing unit 12b reduces the N-th frame of the moving image received from the outside to generate a reduced image. As a specific example, the image reduction processing unit 12b acquires the N-th frame that is moving image data that is received by the input image receiving unit 12a from the outside and is stored in the input image storing unit 11a, performs an image reduction process for reducing the acquired N-th frame to generate a reduced image, and outputs the result to the intermediate smoothed image generating unit 12c to be described below.

The intermediate smoothed image generating unit 12c performs the smoothing process on the generated reduced image at the plurality of preset level values, generates the plurality of intermediate smoothed images, and stores the result in the intermediate smoothed image storing unit 11b.

As a specific example, the intermediate smoothed image generating unit 12c previously applies a multilayer structure to the pixels of the reduced image of the N-th frame received from the image reduction processing unit 12b at the levels of brightness of 0 to 255 gradations to form five planes. The ranges of level values of the multilayered N(0) to N(4) are respectively 0 to 84, 42 to 128, 85 to 160, 129 to 212, and 161 to 255.

Then, the intermediate smoothed image generating unit 12c calculates an average from the values of pixels within the range of level values about the predetermined number of pixels centering on each pixel of the reduced image and stores the computed value as the value of the target pixel. The predetermined number of pixels is a plurality of pixels centering on a target pixel that is decided by the size of filter. At this time, among the pixels within the size of filter, pixels that do not fall within the range of level values of the processing target are not utilized in the case of the calculation of average. When there is not any pixel within the range of level values among the pixels within the size of filter, the average within the range of level values (for example, if it is the range of level values of 0 to 84, the average is "42") is treated as the value of the target pixel for the sake of convenience. The intermediate smoothed image generating unit 12c performs the plurality of smoothing processes corresponding to the multilayered ranges of level values on the pixels inside the reduced image and generates the plurality of intermediate smoothed images that becomes intermediate data in the smoothing process performed by the image processing apparatus 10. After that, the intermediate smoothed image generating unit 12c stores the generated intermediate smoothed images in the intermediate smoothed image storing unit 11b.

It should be noted that the number of planes multilayered by the intermediate smoothed image generating unit 12c is not limited to "5" and the range of level values for each plane is not limited to the value. It is preferable that the number of planes after being multilayered be plural and the level values be set to values obtained by dividing the gradations of 0 to 255 in accordance with the number of planes.

When generating the smoothed images of frames after the (N+1)-th frame, the synthesis processing unit 12d acquires one or a plurality of intermediate smoothed images from the plurality of intermediate smoothed images of the N-th frame stored in the intermediate smoothed image storing unit 11b. Then, the synthesis processing unit 12d synthesizes the acquired intermediate smoothed images of the N-th frame and the frames after the (N+1)-th frame of the moving image received from the outside to generate smoothed images.

As a specific example, when generating a smoothed image for a target pixel for which the level value of the (N+1)-th frame is 100, the synthesis processing unit 12d acquires N(1) that is a plane including the level value of 100 and of which the level values are 42 to 128 and the average of level values is 90 and N(2) of which the level values are 85 to 160 and the average of level values is about 120, among the five intermediate smoothed images (N(0) to N(4)) of the N-th frame, from the intermediate smoothed image storing unit 11b. Then, the synthesis processing unit 12d weights the frame N(1) located at a distance closer to the (N+1)-th frame on the basis of a distance "100−90=10" between the N(1) and the (N+1)-th frame and a distance "120−100=20" between the N(2) and the (N+1)-th frame. Next, the synthesis processing unit 12d synthesizes the intermediate smoothed images (N(1) and N(2)) of the N-th frame acquired at the rate of "N(1):N(2)=2:1" and the (N+1)-th frame of the moving image received from the outside by using an interpolation operation to generate a smoothed image. In addition, the synthesis processing unit 12d stores the generated smoothed image in the smoothed image storing unit 11c.

The synthesis processing unit 12d performs the process described above on the frames after the (N+1)-th frame by replacing the (N+1)-th frame by the frames after the (N+1)-th frame. In the present embodiment, a Y component is used as a processing target and a smoothed image is generated from the intermediate smoothed image of the N-th frame and the image of the (N+1)-th frame. However, the generation result should be treated as the processing result of the (N+1)-th frame. Therefore, when generating the intermediate smoothed image of the N-th frame by using the Y component as a target, it is preferable that the synthesis processing unit 12d extract and synthesizes CbCr components from the (N+1)-th frame as another component and synthesizes the processing target component when generating the intermediate smoothed image of the N-th frame and the other components of the (N+1)-th frame (frame other than the N-th frame) to form a color image.

The image output unit 12e outputs the smoothed image generated by the synthesis processing unit 12d as the output image 2. As a specific example, the image output unit 12e acquires the smoothed image generated by the synthesis processing unit 12d from the smoothed image storing unit 11c and outputs the acquired image as the output image 2.

Process by Image Processing Apparatus According to First Embodiment

Figure 4:
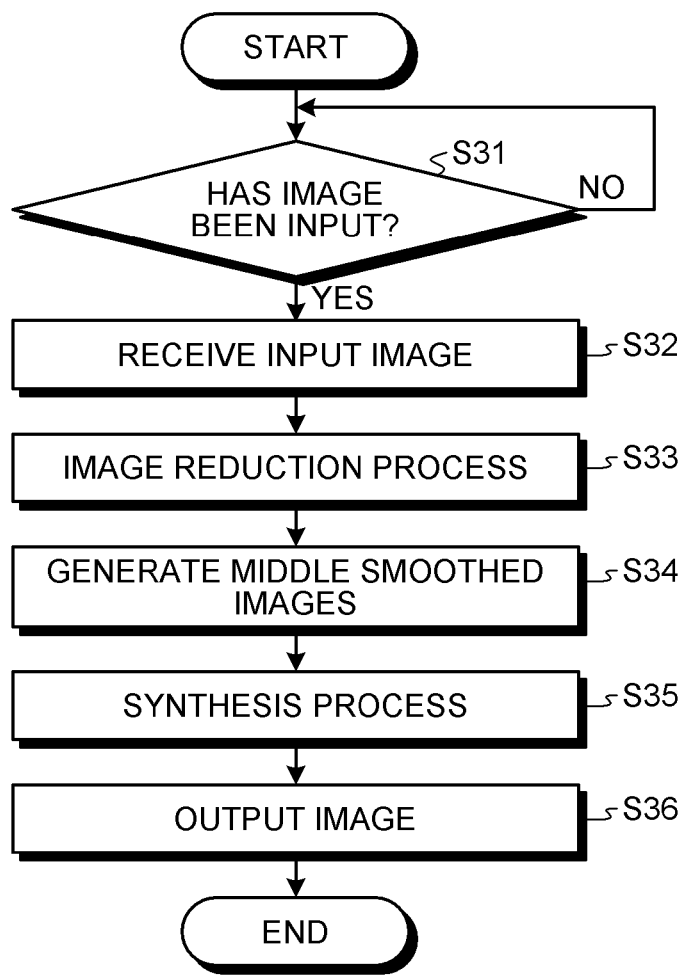
FIG. 4 is a flowchart illustrating a smoothing process performed by the image processing apparatus according to the first embodiment.

Next, it will be explained about a smoothing process performed by the image processing apparatus 10 according to the first embodiment with reference to FIG. 4. FIG. 4 is a flowchart illustrating a smoothing process performed by the image processing apparatus 10 according to the first embodiment.

As illustrated in FIG. 4, when the input image 1 that is the frame of a moving image is input into the image processing apparatus 10 from the outside (Step S31: YES), the input image receiving unit 12a receives the input image input into the image processing apparatus 10 from the outside (Step S32). As a specific example, the input image receiving unit 12a receives the input image 1 that is the N-th frame of moving image data that is input into the image processing apparatus 10 from the outside. Then, the input image receiving unit 12a stores the received input image 1 in the input image storing unit 11a.

Then, the image reduction processing unit 12b reduces the N-th frame of the moving image received by the input image receiving unit 12a to generate a reduced image (Step S33). When specifically explaining the above-described example, the image reduction processing unit 12b acquires the N-th frame from the input image storing unit 11a, performs an image reduction process for reducing the acquired N-th frame to generate a reduced image, and outputs the generated reduced image to the intermediate smoothed image generating unit 12c.

Next, the intermediate smoothed image generating unit 12c performs a smoothing process on the reduced image generated by the image reduction processing unit 12b at the plurality of preset level values and generates a plurality of intermediate smoothed images (Step S34). When specifically explaining the above-described example, the intermediate smoothed image generating unit 12c previously applies a multilayer structure to the pixels of the reduced image of the N-th frame generated by the image reduction processing unit 12b at the levels of brightness (in other words, Y component of YCbCr) of 0 to 255 gradations to form five planes. Then, the intermediate smoothed image generating unit 12c performs a plurality of smoothing processes corresponding to the multilayered ranges of level values, generates the plurality of intermediate smoothed images that becomes intermediate data in the smoothing process performed by the image processing apparatus 10, and stores the generated images in the intermediate smoothed image storing unit 11b. In this case, it is assumed that the ranges of level values of the multilayered N(0) to N(4) are respectively 0 to 84, 42 to 128, 85 to 160, 129 to 212, and 161 to 255.

After that, when generating the smoothed images of frames after the (N+1)-th frame, the synthesis processing unit 12d acquires one or a plurality of intermediate smoothed images from the plurality of intermediate smoothed images of the N-th frame stored in the intermediate smoothed image storing unit 11b and synthesizes the acquired intermediate smoothed images of the N-th frame and the frames after the (N+1)-th frame of the moving image received from the outside to generate smoothed images (Step S35).

When specifically explaining the above-described example, the synthesis processing unit 12d acquires, when generating the smoothed image of the (N+1)-th frame, N(1) of which the average of level values is 90 and N(2) of which the average of level values is 120 among the five intermediate smoothed images (N(0) to N(4)) of the N-th frame from the intermediate smoothed image storing unit 11b. Because the acquired intermediate smoothed images are generated from the reduced image, the number of pixels is small. In other words, the intermediate smoothed images become a rough image. It is only necessary that a pixel to be acquired as an intermediate smoothed image is, for example, the nearest pixel. Then, the synthesis processing unit 12d weights the frame N(1) located at a distance closer to the (N+1)-th frame from a distance between the N(1) and the (N+1)-th frame and a distance between the N(2) and the (N+1)-th frame. Next, the synthesis processing unit 12d synthesizes the intermediate smoothed images (N(1) and N(2)) of the N-th frame acquired at the rate of "N(1):N(2)=2:1" and the (N+1)-th frame of the moving image received from the outside by using an interpolation operation to generate the smoothed image. In addition, the synthesis processing unit 12d stores the generated smoothed image in the smoothed image storing unit 11c.

Then, the image output unit 12e outputs the smoothed image generated by the synthesis processing unit 12d as the output image 2 (Step S36). When specifically explaining the above-described example, the image output unit 12e acquires the smoothed image generated by the synthesis processing unit 12d from the smoothed image storing unit 11c and outputs the acquired image as the output image 2.

Effect by First Embodiment

In this way, the image processing apparatus 10 holds a plurality of intermediate smoothed images smoothed at a plurality of preset level values, reduces the N-th frame image of the moving image received from the outside to generate a reduced image, perform a smoothing process on the generated reduced image at the plurality of preset level values to generate a plurality of intermediate smoothed images, and stores the generated images in a predetermined storage unit. When generating the smoothed images of the frames after the (N+1)-th frame, because the image processing apparatus 10 acquires one or a plurality of intermediate smoothed images from the stored plurality of intermediate smoothed images of the N-th frame, synthesizes the acquired intermediate smoothed images of the N-th frame and frames after the (N+1)-th frame of the moving image received from the outside, and generates smoothed images, a memory capacity necessary for an LPF process can be reduced and edges can be accurately reproduced.

For example, when generating smoothed images by using a low frequency component from a moving image consisting of a plurality of frames received from the outside, the image processing apparatus 10 generates the reduced image of the N-th frame that is moving image data received from the outside. Then, the image processing apparatus 10 performs a plurality of smoothing processes corresponding to the ranges of level values multilayered by five planes on the generated reduced image of the N-th frame for each level of brightness of 0 to 255 gradations and generates a plurality of intermediate smoothed images. Next, the image processing apparatus 10 synthesizes the generated intermediate smoothed images and frames after the (N+1)-th frame of the moving image received from the outside to generate smoothed images and outputs the generated images as output images. In other words, because the reduction of image and the generation of intermediate smoothed image are not performed on frames after the (N+1)-th frame by generating a smoothed image for the frames after the (N+1)-th frame by using the intermediate smoothed images generated from the reduced image of the N-th frame, a memory capacity necessary for an LPF process can be reduced and edges can be accurately reproduced.

Moreover, when synthesizing the generated intermediate smoothed images and the processing target frame, the image processing apparatus 10 can perform the synthesis process by using simple arithmetic processing because the ratio of synthesis process is decided with reference to the processing target frame.

[b] Second Embodiment

However, in the first embodiment, it has been explained about the case where a smoothing process is performed on the frames after the (N+1)-th frame by using the N-th frame.

However, the present invention is not limited to this. The image processing apparatus can generate the intermediate smoothed images from the N-th frame while the plurality of frames is input and perform a smoothing process on frames after the (N+3)-th frame by using the generated N-th frame.

Time Chart of Smoothing Process According to Second Embodiment

Figure 5:
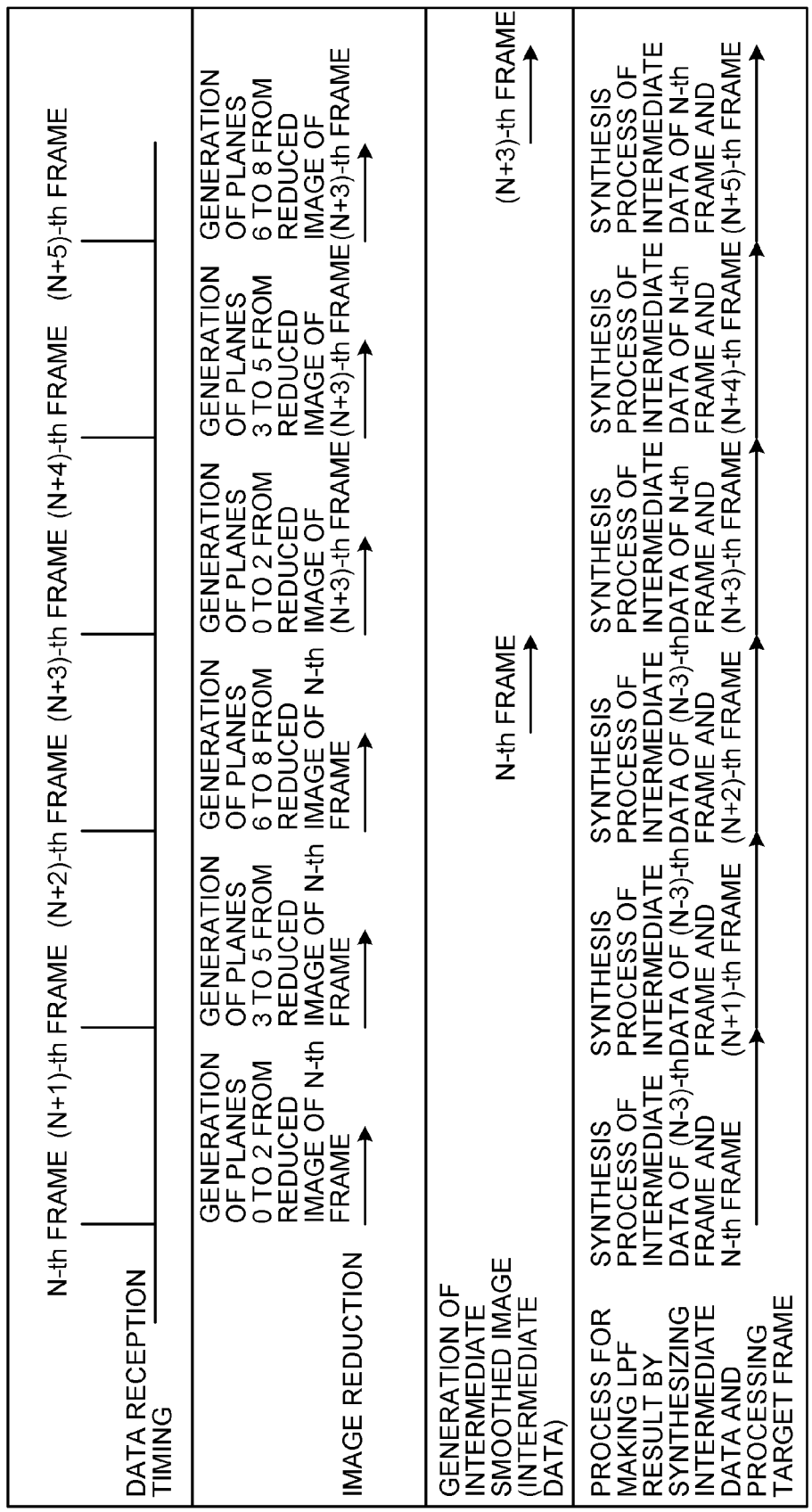
FIG. 5 is a diagram explaining a time chart of a smoothing process performed by an image processing apparatus according to a second embodiment.

Therefore, in the following second embodiment, it will be explained about the time chart of the smoothing process performed by the image processing apparatus 10 according to the second embodiment with reference to FIG. 5. FIG. 5 is a diagram explaining the time chart of the smoothing process performed by the image processing apparatus 10 according to the second embodiment. In this case, it will be explained about the case where moving image data is received by six frames from the N-th frame to the (N+5)-th frame and a smoothing process (LPF process) for three frames is performed by using one intermediate data.

As illustrated in FIG. 5, when receiving the N-th frame from the outside, the image processing apparatus 10 reduces, until the smoothed image of the (N+3)-th frame is generated, the image of the N-th frame to generate a reduced image and generates the intermediate smoothed images of nine planes (0-th plane to 8-th plane) obtained from a plurality of smoothing processes corresponding to the ranges (the multilayer of 0 to 255 gradations) of the plurality of preset level values for the generated reduced image. In other words, the image processing apparatus 10 generates the intermediate smoothed images of the N-th frame from the reception of the N-th frame to the reception of the (N+3)-th frame.

Then, when generating the smoothed image of the (N+3)-th frame, the image processing apparatus 10 acquires one or a plurality of intermediate smoothed images from the intermediate smoothed images of the nine planes generated from the reduced image of the N-th frame and synthesizes the acquired intermediate smoothed images and the (N+3)-th frame that is a processing target frame to generate a smoothed image.

Next, when generating the smoothed image of the (N+4)-th frame, the image processing apparatus 10 acquires one or a plurality of intermediate smoothed images from the intermediate smoothed images of the nine planes generated from the reduced image of the N-th frame and synthesizes the acquired intermediate smoothed images and the (N+4)-th frame that is a processing target frame to generate a smoothed image.

After that, when generating the smoothed image of the (N+5)-th frame, the image processing apparatus 10 acquires one or a plurality of intermediate smoothed images from the intermediate smoothed images of the nine planes generated from the reduced image of the N-th frame and synthesizes the acquired intermediate smoothed images and the (N+5)-th frame that is a processing target frame to generate a smoothed image.

Moreover, when receiving the (N+3)-th frame from the outside, the image processing apparatus 10 reduces the image of the (N+3)-th frame to generate a reduced image until the smoothed image of the (N+6)-th frame is generated. Then, the image processing apparatus 10 generates the intermediate smoothed images of the nine planes obtained from the plurality of smoothing processes corresponding to the ranges of the plurality of preset level values for the generated reduced image. Next, the image processing apparatus 10 synthesizes the intermediate smoothed images of the generated (N+3)-th frame with the (N+6)-th frame, the (N+7)-th frame, and the (N+8)-th frame and generates smoothed images.

The N-th frame, the (N+1)-th frame, and the (N+2)-th frame are synthesized by using the intermediate smoothed images generated from the (N−3)-th frame. In other words, the image processing apparatus 10 repeats a process for generating the plurality of intermediate smoothed images of planes 0 to 2, planes 3 to 5, and planes 6 to 8 from the reduced image of the N-th frame while the plurality of frames is received, synthesizing the generated intermediate smoothed images with the (N+3)-th frame, the (N+4)-th frame, and the (N+5)-th frame that become a processing target, and generating the smoothed images of the plurality of frames.

In this way, because the image processing apparatus 10 according to the second embodiment generates the intermediate smoothed images of one frame until the plurality of frames is received, the load related to the process can be dispersed.

In this case, it has been explained about the case where the image processing apparatus 10 generates nine planes in the case of the generation of intermediate smoothed images. However, the number of planes is not limited to nine planes. The number of planes can be arbitrarily set like five planes. Moreover, it has been explained about the case where a new intermediate smoothed image is generated when performing a smoothing process on three frames. However, the number of frames is not limited to three frames. The number of frames can be arbitrarily set like five frames.

[c] Third Embodiment

In the first embodiment, it has been explained about the case where the intermediate smoothed images corresponding to the plurality of level values are generated from the reduced image of the N-th frame of the input moving image. However, the present invention is not limited to this. The image processing apparatus can also synchronize the pixel position of the reduced image of the N-th frame with the pixel positions of the frames after the (N+1)-th frame to generate intermediate smoothed images.

Smoothing Process by Image Processing Apparatus According to Third Embodiment

Figure 6:
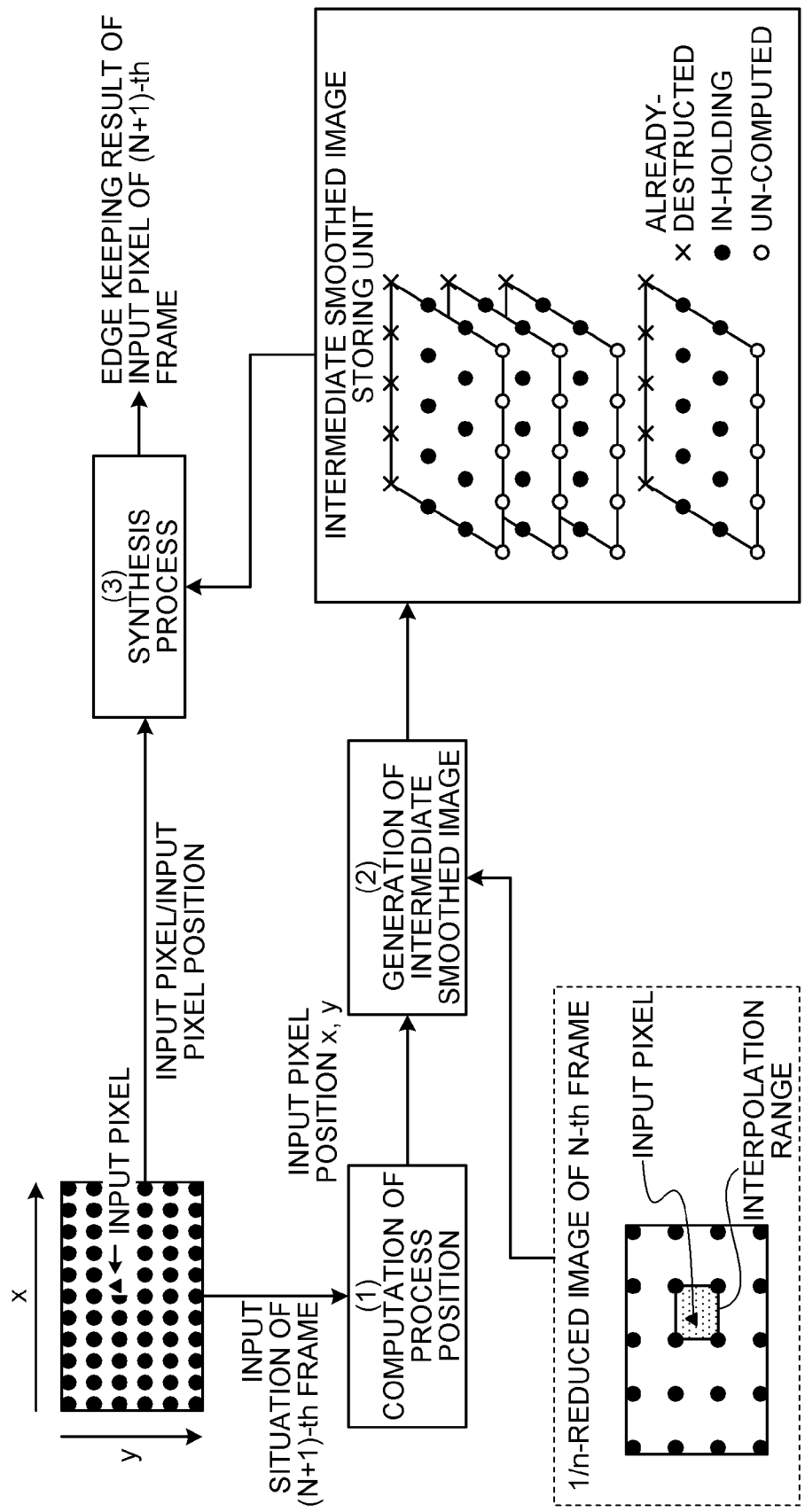
FIG. 6 is a diagram explaining a smoothing process performed by an image processing apparatus according to a third embodiment.

Therefore, in the following third embodiment, it will be explained about the case where the image processing apparatus synchronizes the pixel position of the N-th frame and the pixel positions of the frames after the (N+1)-th frame to generate intermediate smoothed images with reference to FIG. 6. In this case, in the following third embodiment, it is assumed that the position of each input pixel that becomes the processing target of the frames after the (N+1)-th frame is an "input pixel (x, y)" by using x-y coordinates and the reduction rate of the reduced image of the N-th frame is 1/n against the frames after the (N+1)-th frame. FIG. 6 is a diagram explaining a smoothing process performed by the image processing apparatus according to the third embodiment.

As illustrated in FIG. 6, the image processing apparatus 10 acquires the position information of each pixel in the frames after the (N+1)-th frame of the moving image received from the outside and computes each pixel position of the reduced image of the N-th frame corresponding to this position information (see (1) of FIG. 6).

As a specific example, the image processing apparatus 10 acquires an "input pixel (x, y)" as the position information of each pixel in the frames after the (N+1)-th frame of the moving image received from the outside. Then, the image processing apparatus 10 computes the interpolation range (gray part) of the input pixel of the reduced image of the N-th frame corresponding to the acquired position information "input pixel (x, y)". In this case, because the reduction rate of the reduced image of the N-th frame is 1/n against the frames after the (N+1)-th frame, the interpolation range is computed as "(int(x/n), int(y/n))", "(int(x/n)+1, int(y/n))", "(int(x/n), int(y/n)+1)", and "(int(x/n)+1, int(y/n)+1)".

Then, the image processing apparatus 10 performs a smoothing process at a plurality of preset level values on the generated reduced image of the N-th frame within a predetermined range including the computed each pixel position to generate a plurality of intermediate smoothed images and stores the generated images in the intermediate smoothed image storing unit (see (2) of FIG. 6).

When specifically explaining the above-described example, the image processing apparatus 10 performs a plurality of smoothing processes corresponding to the ranges of level values previously multilayered by a plurality of planes at the levels of brightness of 0 to 255 gradations within a predetermined interpolation range including the computed each pixel position and generates a plurality of intermediate smoothed images. Then, the image processing apparatus 10 stores the generated intermediate smoothed images in the intermediate smoothed image storing unit 11*b*. In addition, if there is an "un-computed" pixel, the image processing apparatus 10 repeatedly performs the above-described smoothing process.

Next, when generating the smoothed images of the frames after the (N+1)-th frame, the image processing apparatus 10 acquires one or a plurality of intermediate smoothed images from the plurality of intermediate smoothed images of the N-th frame stored in the intermediate smoothed image storing unit 11*b*, synthesizes the acquired intermediate smoothed images of the N-th frame and the frames after the (N+1)-th frame of the moving image received from the outside to generate smoothed images, and destroys a part or the whole of the plurality of intermediate smoothed images that are stored in the intermediate smoothed image storing unit 11*b* and are already utilized for the synthesis (see (3) of FIG. 6).

When specifically explaining the above-described example, the image processing apparatus 10 acquires one or a plurality of intermediate smoothed images among the plurality of intermediate smoothed images of the N-th frame from the intermediate smoothed image storing unit 11*b* when generating the smoothed images of the frames after the (N+1)-th frame. Then, the image processing apparatus 10 synthesizes the acquired intermediate smoothed images of the N-th frame and the frames after the (N+1)-th frame of the moving image received from the outside and generates smoothed images. Next, the image processing apparatus 10 destructs (already-destructed) a part or the whole of the "in-holding" intermediate smoothed images that are stored in the intermediate smoothed image storing unit 11*b* and are already utilized for the synthesis. It is only necessary that the intermediate smoothed image storing unit 11*b* stores, as intermediate smoothed images, only "in-holding" data that are in the interpolation range part of the reduced image of the N-th frame for the input pixels of the frames after the (N+1)-th frame that are utilized for the synthesis process. After that, the image processing apparatus 10 repeats such a process and obtains the result of the smoothing process in which the edges of the input pixels of the frames after the (N+1)-th frame are held.

In this case, it is only necessary that the intermediate smoothed image storing unit 11*b* stores, as intermediate smoothed images, only "in-holding" data that are in the interpolation range part of the reduced image of the N-th frame for the input pixels of the frames after the (N+1)-th frame that are utilized for the synthesis process among "already-destructed" data that are utilized for the synthesis process and is already destroyed, "in-holding" data that are in the interpolation range part of the reduced image of the N-th frame for the input pixels of the frames after the (N+1)-th frame that are utilized for the synthesis process, and "un-computed" data that is not utilized for the synthesis process. In other words, when performing the synthesis process, the image processing apparatus 10 performs the synthesis process while synchronizing the synthesis process with the change of the pixel position of a processing target frame, generating only minimum intermediate smoothed images that are required for the synthesis process, and destroying the intermediate smoothed images on which the synthesis process is already performed.

In this way, when the image processing apparatus 10 according to the third embodiment holds, among the generated plurality of intermediate smoothed images, only the intermediate smoothed images within the predetermined range that are utilized for the synthesis process, reduces the N-th frame image of the moving image received from the outside to generate a reduced image, acquires the position information of each pixel in the frames after the (N+1)-th frame of the moving image received from the outside, computes each pixel position of the reduced image of the N-th frame corresponding to this position information, performs the smoothing process at the plurality of preset level values on the generated reduced image within the predetermined range including the computed each pixel position, generates a plurality of intermediate smoothed images, stores the generated images in the intermediate smoothed image storing unit 11*b*, and generates the smoothed images of the frames after the (N+1)-th frame, because the image processing apparatus 10 acquires one or a plurality of intermediate smoothed images among the plurality of intermediate smoothed images of the N-th frame from the intermediate smoothed image storing unit 11*b*, synthesizes the acquired intermediate smoothed images of the N-th frame and the frames after the (N+1)-th frame of the moving image received from the outside to generate the smoothed images, and destroys a part or the whole of the plurality of intermediate smoothed images that are stored in the intermediate smoothed image storing unit 11*b* and are already utilized for the synthesis, a memory capacity necessary for an LPF process can be further reduced.

For example, when generating a smoothed image from a moving image consisting of a plurality of frames received from the outside by using a low frequency component, the image processing apparatus 10 generates a smoothed image while computing the interpolation range of the input pixel of the N-th reduced image from the position information of each pixel in processing target frames after the (N+1)-th frame, storing the intermediate smoothed images in only the interpolation range, and destroying a part or the whole of the intermediate smoothed images that are already utilized for the synthesis process. As a result, a memory capacity necessary for an LPF process can be further reduced.

[d] Fourth Embodiment

In the first embodiment, it has been explained about the smoothing process for generating the intermediate smoothed images corresponding to the plurality of level values from the reduced image of the N-th frame of the input moving image. In the case of the implementation of the smoothing process, the smoothing process may be realized by various configurations different from the configuration illustrated in FIG. 1.

In various configurations different from the configuration illustrated in the FIG. 1, for example, the smoothing process may be performed in a time sharing manner by sharing one LPF that generates the plurality of intermediate smoothed images, or the smoothing process may be performed in a time sharing manner and in parallel by sharing two LPFs that generate the plurality of intermediate smoothed images. Hereinafter, it will be explained about a smoothing process performed by the detailed configuration of the image processing apparatus 10 according to the first embodiment with reference to FIG. 8 and a smoothing process performed by the various configurations different from FIG. 8 with reference to FIGS. 9 and 10.

Smoothing Process by Image Processing Apparatus According to Fourth Embodiment

Figure 8:
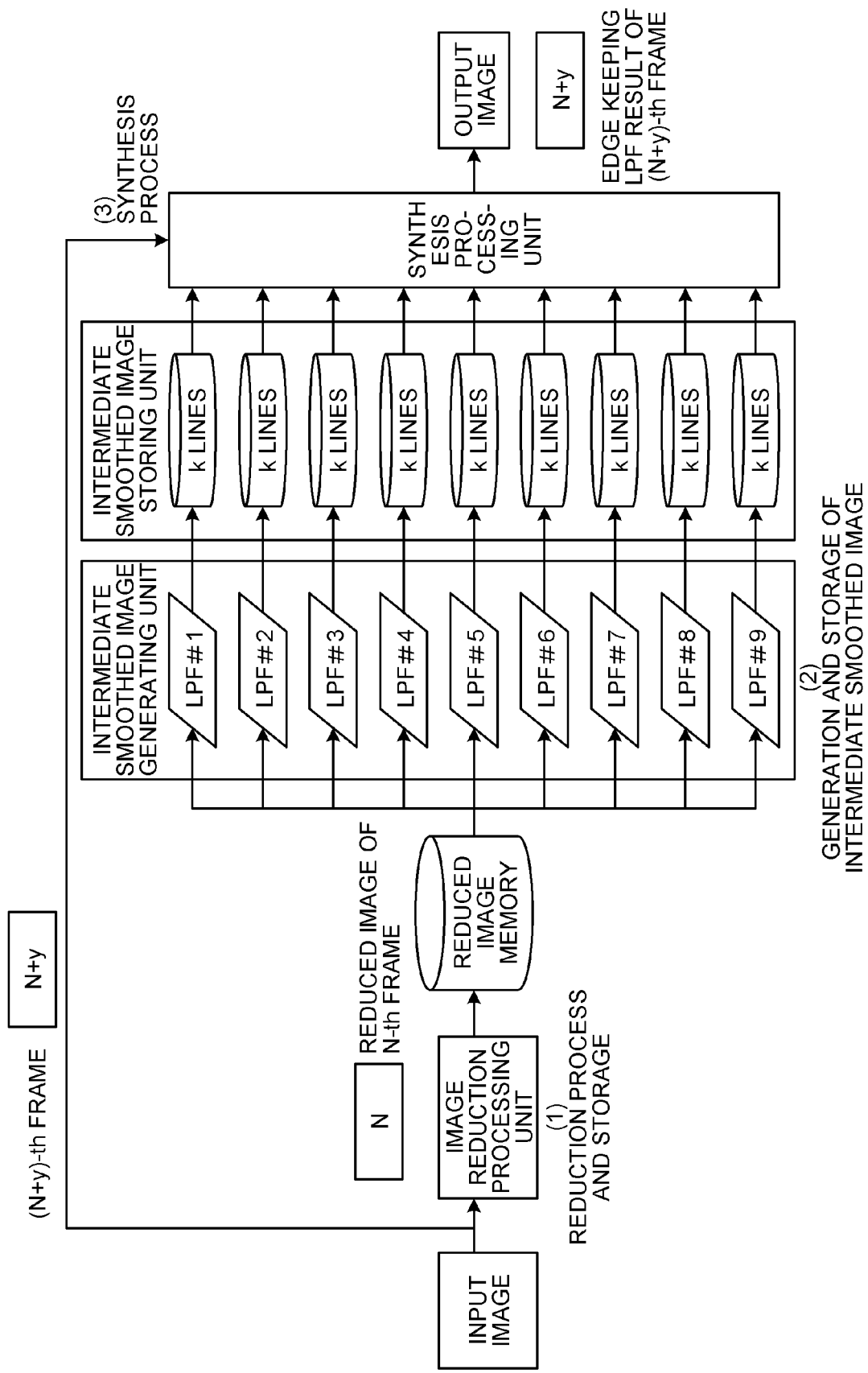
FIG. 8 is a diagram explaining a smoothing process in the configuration of an image processing apparatus according to a fourth embodiment.

First, it will be explained about a smoothing process performed by the detailed configuration of the image processing apparatus 10 according to the above-described first embodiment with reference to FIG. 8. FIG. 8 is a diagram explaining a smoothing process performed by the configuration of the image processing apparatus 10 according to the fourth embodiment.

In the image processing apparatus 10 according to the fourth embodiment, the intermediate smoothed image generating unit 12c includes nine LPFs from LPF*1 to LPF*9. Moreover, in the image processing apparatus 10, the intermediate smoothed image storing unit 11b includes nine memories corresponding to the nine LPFs. The image processing apparatus 10 synthesizes the reduced image of the smoothed N-th frame with the (N+y)-th (y is 1 or more) frame and outputs the smoothed image (output image) of the (N+y)-th frame in which edges are kept.

In such a configuration, the image processing apparatus 10 reduces the N-th frame image of the moving image received from the outside to generate a reduced image and stores the generated reduced image in a reduced image memory (see (1) of FIG. 8). As a specific example, when receiving the N-th frame of moving image data from the outside, the image processing apparatus 10 performs a reduction process for reducing the N-th frame of moving image data received from the outside and generates a reduced image. The image processing apparatus 10 then stores the generated reduced image in the reduced image memory.

Then, the image processing apparatus 10 performs the smoothing process at the plurality of preset level values on the generated reduced image to generate a plurality of intermediate smoothed images and stores the generated images in the intermediate smoothed image storing unit (see (2) of FIG. 8). When specifically explaining the above-described example, the image processing apparatus 10 performs an LPF process in parallel (simultaneously) that is restricted at the level values of brightness of 0 to 255 gradations for the reduced image stored in the reduced image memory by using the nine LPFs (LPF*1 to LPF*9) and generates nine intermediate smoothed images.

Then, the image processing apparatus 10 respectively stores the generated nine intermediate smoothed images in the memories of the intermediate smoothed image storing unit 11b corresponding to these images. Furthermore, the intermediate smoothed image storing unit 11b respectively stores the results of the level-value restriction LPF process performed by LPF*1 to LPF*9 in k line memories that are required for the synthesis process of the N-th frame and the (N+y)-th frame performed by the synthesis processing unit 12d.

Next, when generating the smoothed image of the (N+y)-th frame, the image processing apparatus 10 acquires one or a plurality of intermediate smoothed images from the plurality of intermediate smoothed images of the N-th frame stored in the intermediate smoothed image storing unit, synthesizes the acquired intermediate smoothed images of the N-th frame and the (N+y)-th frame of the moving image received from the outside, and generates the smoothed image (see (3) of FIG. 8).

When specifically explaining the above-described example, the image processing apparatus 10 acquires one or a plurality of intermediate smoothed images among the nine intermediate smoothed images of the N-th frame from the intermediate smoothed image storing unit 11b when generating the smoothed image of the (N+y)-th frame. Then, the image processing apparatus 10 synthesizes the acquired intermediate smoothed images of the N-th frame with the (N+y)-th frame of the moving image received from the outside and generates the smoothed image (output image) of the (N+y)-th frame in which edges are kept.

It should be noted that the generation of intermediate smoothed images using the reduced image of the N-th frame is completed before a synthesis process starts in the synthesis process of the N-th frame and the (N+y)-th frame in such a manner that the pixel of the (N+y)-th frame is not delayed.

In this way, the image processing apparatus 10 according to the fourth embodiment smoothes the reduced image of the N-th frame by using the plurality of LPFs corresponding to the plurality of level values and synthesizes the N-th frame and the (N+y)-th (y is "1" or more) frame without delaying the pixel of the (N+y)-th frame. As a result, a memory according to a process can be reduced. In other words, the image processing apparatus 10 does not require a memory that delays the pixel of the (N+y)-th frame and can minimize "k" of line memories of the intermediate smoothed image storing unit lib. As a result, a memory according to a process can be reduced.

[e] Fifth Embodiment

In the fourth embodiment, it has been explained about the case where the smoothing process is performed in accordance with the configuration that the intermediate smoothed image generating unit 12c includes the nine LPFs from LPF*1 to LPF*9 and the intermediate smoothed image storing unit 11b includes the nine memories corresponding to the nine LPFs. However, the present invention is not limited to this. The smoothing process can be performed in accordance with the configuration that the intermediate smoothed image generating unit 12c includes one LPF corresponding to a plurality of level values and the intermediate smoothed image storing unit 11b includes memories that store LPF results corresponding to the plurality of level values.

Smoothing Process by Image Processing Apparatus According to Fifth Embodiment

Figure 9:
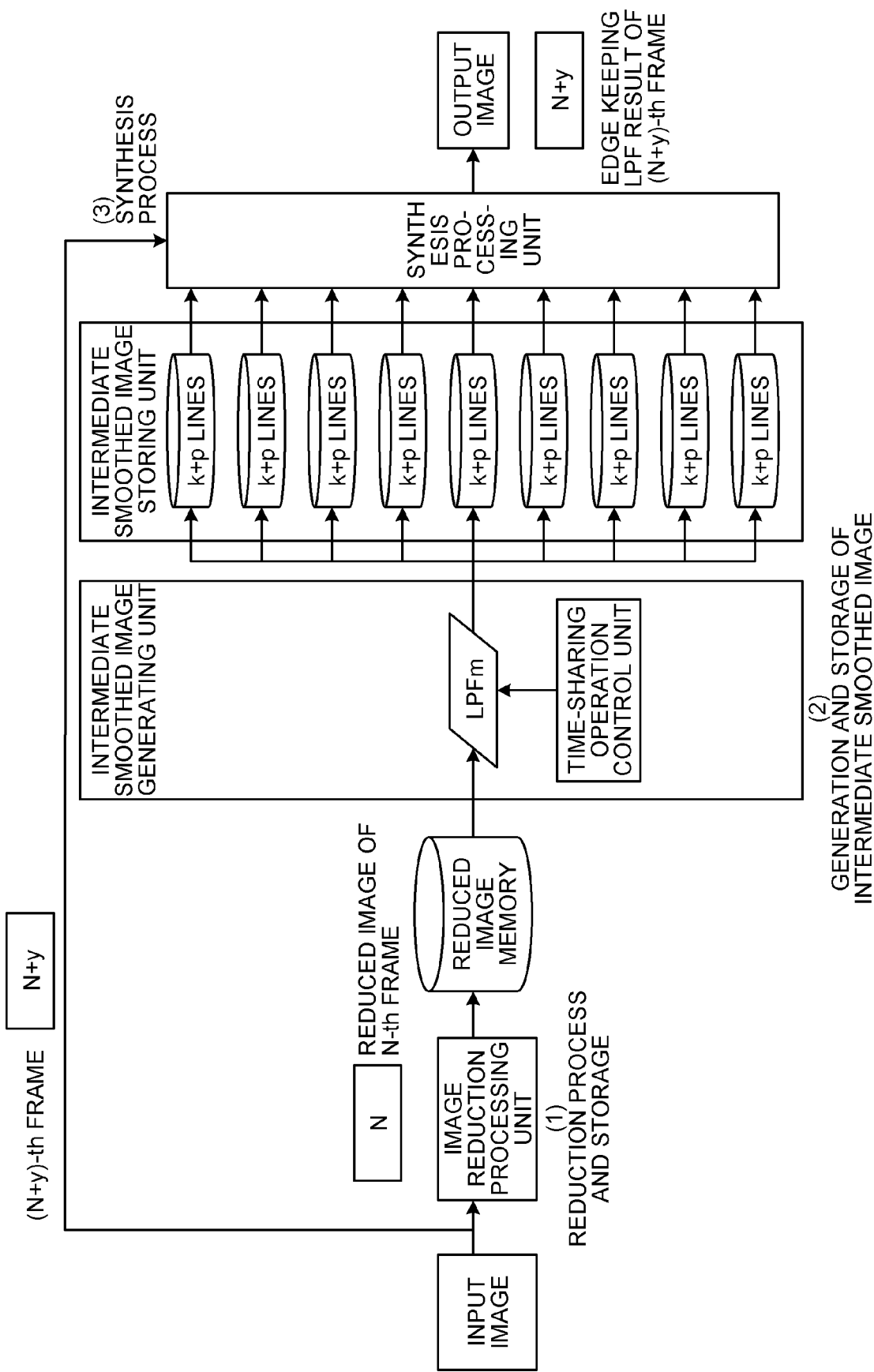
FIG. 9 is a diagram explaining a smoothing process in the configuration of an image processing apparatus according to a fifth embodiment.

In the following fifth embodiment, it will be explained about the case where the image processing apparatus 10 shares one LPF that generates a plurality of intermediate smoothed images and performs a smoothing process in a time sharing manner with reference to FIG. 9. FIG. 9 is a diagram explaining a smoothing process performed by the configuration of the image processing apparatus 10 according to the fifth embodiment.

In the image processing apparatus 10 according to the fifth embodiment, the intermediate smoothed image generating unit 12c includes one LPFm (for example, parameter m=1 to 9) that can change the plurality of level values (for example, "9") and a time-sharing operation control unit that controls the time-sharing operation of the LPFm that performs nine LPF processes. Moreover, in the image processing apparatus 10, the intermediate smoothed image storing unit 11b includes nine memories corresponding to the LPFm that performs nine LPF processes. The image processing apparatus 10 synthesizes the reduced image of the smoothed N-th frame with the (N+y)-th (y is "1" or more) frame and outputs the smoothed image (output image) of the (N+y)-th frame in which edges are kept.

In such a configuration, the image processing apparatus 10 reduces the N-th frame image of the moving image received from the outside to generate a reduced image and stores the generated reduced image in a reduced image memory (see (1) of FIG. 9). As a specific example, when receiving the N-th frame of moving image data from the outside, the image processing apparatus 10 performs a reduction process for reducing the N-th frame of moving image data received from the outside and generates a reduced image. The image processing apparatus 10 then stores the generated reduced image in the reduced image memory.

Then, the image processing apparatus 10 performs the smoothing process on the generated reduced image on the basis of level-value restriction parameters and motion control information to generate a plurality of intermediate smoothed images and stores the generated images in the intermediate smoothed image storing unit (see (2) of FIG. 9). When specifically explaining the above-described example, the time-sharing operation control unit in the image processing apparatus 10 transmits the level-value restriction parameters of "m=1 to 9" and the motion control information indicating movement directive for the LPFm according to each parameter of "m=1 to 9" to the LPFm.

Then, the image processing apparatus 10 performs the LPF process in which level values are restricted by using time-sharing processing (by performing a process corresponding to each parameter every hour) by using one LPFm on the reduced image stored in the reduced image memory and generates nine intermediate smoothed images. The variable parameter "m" in the LPFm is not only "9", but may be also 9 or more to hold a plurality of parameters that is not less than nine.

Next, the image processing apparatus 10 stores the generated nine intermediate smoothed images in the corresponding memories of the intermediate smoothed image storing unit 11b. Moreover, the LPF process performed by time-sharing processing in which level values are restricted is, for example, performed in units of one line of the reduced image in order to process predetermined packaged data for one kind of parameter. Each memory of the intermediate smoothed image storing unit 11b in the process of the units of one line is increased by one line in the size of reduced image, resulting in "(k+p) lines" (for example, p=1), compared with the memory "k lines" illustrated in FIG. 8.

Next, when generating the smoothed image of the (N+y)-th frame, the image processing apparatus 10 acquires one or a plurality of intermediate smoothed images from the plurality of intermediate smoothed images of the N-th frame stored in the intermediate smoothed image storing unit, synthesizes the acquired intermediate smoothed images of the N-th frame and the (N+y)-th frame of the moving image received from the outside, and generates a smoothed image (see (3) of FIG. 9).

When specifically explaining the above-described example, the image processing apparatus 10 acquires one or a plurality of intermediate smoothed images among the nine intermediate smoothed images of the N-th frame from the intermediate smoothed image storing unit 11b when generating the smoothed image of the (N+y)-th frame. Then, the image processing apparatus 10 synthesizes the acquired intermediate smoothed images of the N-th frame with the (N+y)-th frame of the moving image received from the outside and generates the smoothed image (output image) of the (N+y)-th frame in which edges are kept.

When the reduction rate of the input image is longitudinal ⅛ and transverse ⅛, because the reduced image has the size of 1/64 of the input image, the number of cycles in the smoothing process may be 64 cycles by which the reduced image can be read by the pixel clocks of the input image. In other words, the time-sharing processing of sharing LPF has the sufficient number of processing cycles until before the synthesis process of the N-th frame and the (N+y)-th frame is performed.

In this way, the image processing apparatus 10 according to the fifth embodiment can share one LPF corresponding to the plurality of variable level values to smooth the reduced image of the N-th frame and synthesize the N-th frame and the (N+y)-th (y is "1" or more) frame. As a result, a circuit scale can be reduced and the smoothing process that accurately reproduces edges can be performed. In other words, because the memory increase "(k+p) lines" of one line in the reduced image does not largely influence the whole process, the image processing apparatus 10 can share one LPF corresponding to the plurality of variable level values and perform the smoothing process. As a result, a circuit scale can be reduced and the smoothing process that accurately reproduces edges can be performed compared with performing the smoothing process by using the plurality of LPFs (for example, nine or the like).

[f] Sixth Embodiment

In the fifth embodiment, it has been explained about the case where the smoothing process is performed in accordance with the configuration that the intermediate smoothed image generating unit 12c includes one LPF corresponding to the plurality of level values and the intermediate smoothed image storing unit 11b includes memories that store LPF results corresponding to the plurality of level values. However, the present invention is not limited to this. The smoothing process may be performed in accordance with the configuration that the intermediate smoothed image generating unit 12c includes two LPFs corresponding to the plurality of level values and the intermediate smoothed image storing unit 11b includes memories that store LPF results corresponding to the plurality of level values.

Smoothing Process by Image Processing Apparatus According to Sixth Embodiment

Figure 10:
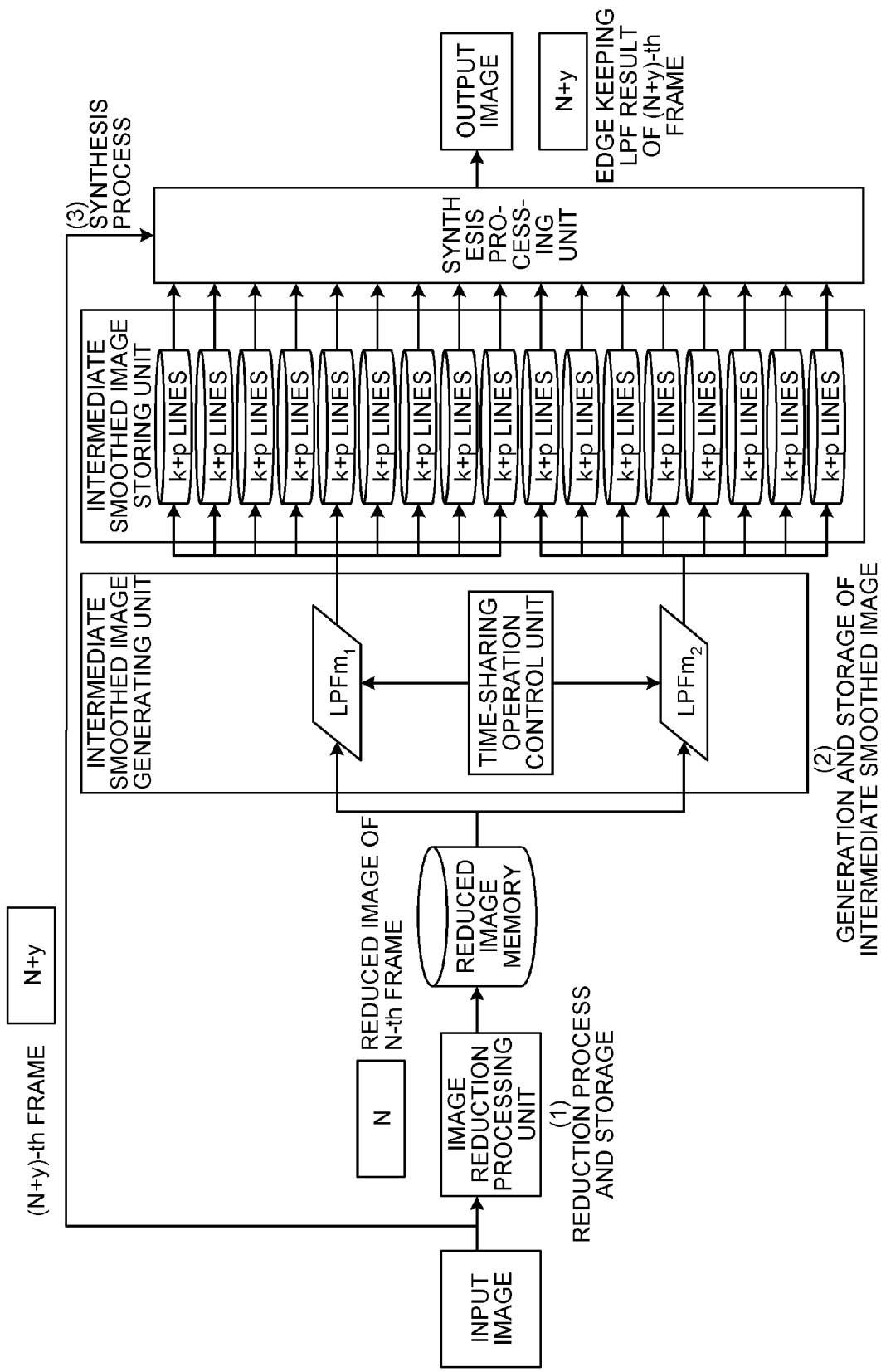
FIG. 10 is a diagram explaining a smoothing process in the configuration of an image processing apparatus according to a sixth embodiment.

In the following sixth embodiment, it will be explained about the case where the image processing apparatus 10 shares two LPFs that generate a plurality of intermediate smoothed images and performs a smoothing process in a time-sharing manner and in parallel with reference to FIG. 10. FIG. 10 is a diagram explaining a smoothing process performed by the configuration of the image processing apparatus 10 according to the sixth embodiment.

In the image processing apparatus 10 according to the sixth embodiment, the intermediate smoothed image generating unit 12c includes one LPFm$_1$ (for example, parameter m$_1$=1 to 9) that can change the plurality of level values (for example, "9" or the like) and one LPFm$_2$ (for example, parameter m$_2$=1 to 8) that can change the plurality of level values (for example, "8" or the like). Moreover, in the image processing apparatus 10, the intermediate smoothed image storing unit 11b includes nine memories corresponding to the LPFm$_1$ that performs nine LPF processes and eight memories corresponding to the LPFm$_2$ that performs eight LPF processes. The image processing apparatus 10 synthesizes the reduced image of the smoothed N-th frame with the (N+y)-th (y is "1" or more) frame and outputs the smoothed image (output image) of the (N+y)-th frame in which edges are kept.

In such a configuration, the image processing apparatus 10 reduces the N-th frame image of the moving image received from the outside to generate a reduced image and stores the generated reduced image in the reduced image memory (see (1) of FIG. 10). As a specific example, when receiving the N-th frame of moving image data from the outside, the image processing apparatus 10 performs a reduction process for reducing the N-th frame of moving image data received from the outside and generates a reduced image. The image processing apparatus 10 then stores the generated reduced image in the reduced image memory.

Then, the image processing apparatus 10 performs the smoothing process on the generated reduced image on the basis of level-value restriction parameters and motion control information, generates a plurality of intermediate smoothed images, and stores the generated images in the intermediate smoothed image storing unit (see (2) of FIG. 10). When specifically explaining the above-described example, the time-sharing operation control unit in the image processing apparatus 10 transmits the level-value restriction parameters of "$m_1$=1 to 9" and the motion control information indicating movement directive for the LPFm$_1$ according to each parameter of "$m_1$=1 to 9" to the LPFm$_1$. Moreover, the time-sharing operation control unit in the image processing apparatus 10 transmits the level-value restriction parameters of "$m_2$=1 to 8" and the motion control information indicating movement directive for the LPFm$_2$ according to each parameter of "$m_2$=1 to 8" to the LPFm$_2$.

Then, the image processing apparatus 10 performs the LPF process in which level values are restricted by using time-sharing processing (performing a process corresponding to each parameter every hour) and parallel processing (simultaneous processing) by using two LPFs of LPFm$_1$ and LPFm$_2$ on the reduced image stored in the reduced image memory and generates 17 intermediate smoothed images. Next, the image processing apparatus 10 stores the generated 17 intermediate smoothed images in the corresponding memories of the intermediate smoothed image storing unit 11b.

Moreover, the LPF process in which level values are restricted and that is performed by time-sharing processing and parallel processing is, for example, performed in units of one line of the reduced image in order to process predetermined packaged data for one kind of parameter. Each memory of the intermediate smoothed image storing unit 11b in the process of units of one line is increased by one line "(k+p) lines" (for example, p=1) in the size of the reduced image compared with the memory "k lines" illustrated in FIG. 8. The above-described parallel processing can be realized by two or more configurations.

Next, when generating the smoothed image of the (N+y)-th frame, the image processing apparatus 10 acquires one or a plurality of intermediate smoothed images from the plurality of intermediate smoothed images of the N-th frame stored in the intermediate smoothed image storing unit, synthesizes the acquired intermediate smoothed images of the N-th frame and the (N+y)-th frame of the moving image received from the outside, and generates the smoothed image (see (3) of FIG. 10).

When specifically explaining the above-described example, the image processing apparatus 10 acquires one or a plurality of intermediate smoothed images among the 17 intermediate smoothed images of the N-th frame from the intermediate smoothed image storing unit 11b when generating the smoothed image of the (N+y)-th frame. Then, the image processing apparatus 10 synthesizes the acquired intermediate smoothed images of the N-th frame with the (N+y)-th frame of the moving image received from the outside and generates the smoothed image (output image) of the (N+y)-th frame in which edges are kept.

When the reduction rate of the input image is longitudinal ⅛ and transverse ⅛, because the reduced image has the size of 1/64 of the input image, the number of cycles in the smoothing process may be 64 cycles by which the reduced image can be read by the pixel clock of the input image. In other words, the time-sharing processing of sharing LPF has the sufficient number of processing cycles until before the synthesis process of the N-th frame and the (N+y)-th frame is performed.

In this way, the image processing apparatus 10 according to the sixth embodiment can share two LPFs corresponding to the plurality of variable level values, smooth the reduced image of the N-th frame, and synthesize the N-th frame and the (N+y)-th (y is "1" or more) frame. As a result, a circuit scale can be reduced and a processing time can be shortened. In other words, because the memory increase "(k+p) lines" of one line in the reduced image does not largely influence the whole process, the image processing apparatus 10 can share the two LPFs corresponding to the plurality of variable level values and perform the smoothing process. As a result, a circuit scale can be reduced compared with performing the smoothing process by using the plurality of LPFs (for example, 17 or the like) and a processing time can be shortened compared with performing the smoothing process by sharing one LPF (for example, performing 17 smoothing processes by using one LPF).

[g] Seventh Embodiment

It has been explained about the embodiments of the present invention till now. In addition to the embodiments described above, the present invention may be realized in accordance with various different configurations. Therefore, it will be explained about a different embodiment centered on: (1) System Configuration; (2) Data Acquisition located close to Target Pixel; (3) Synthesis Process by Secondary Interpolation; (4) Data required for Synthesis Process; and (5) Program.

(1) System Configuration

For example, processing procedures, control procedures, concrete titles, and information (for example, "level value" information that is utilized to generate the intermediate smoothed images stored in the intermediate smoothed image storing unit 11b illustrated in FIG. 2) including various types of data and parameters, which are described in the document and the drawings, can be arbitrarily changed except that they are specially mentioned.

Each component of each device illustrated in the drawings is a functional concept. Therefore, these components are not necessarily constituted physically as illustrated in the drawings. In other words, the specific configuration of dispersion/integration of each device is not limited to the illustrated configuration. Therefore, all or a part of each device can be dispersed or integrated functionally or physically in an optional unit in accordance with various types of loads or operating conditions. For example, the synthesis processing unit 12d and the image output unit 12e may be integrated as an image synthesis output unit. Furthermore, all or a part of each process function performed by each device can be realized by CPU and a program that is analyzed and executed by the CPU or can be realized by a hardware by wired logic.

(2) Data Acquisition Located Close to Target Pixel

Moreover, in the first embodiment, it has been explained about the case where the image processing apparatus 10 decides the ratio of synthesis in a synthesis process with reference to a processing target frame and performs the synthesis process by using an interpolation operation. However, the present invention is not limited to this. The image processing apparatus 10 can acquire a plurality of reduced images adjacent to each input pixel position of a processing target frame and perform a synthesis process by using an interpolation operation.

Figure 7:
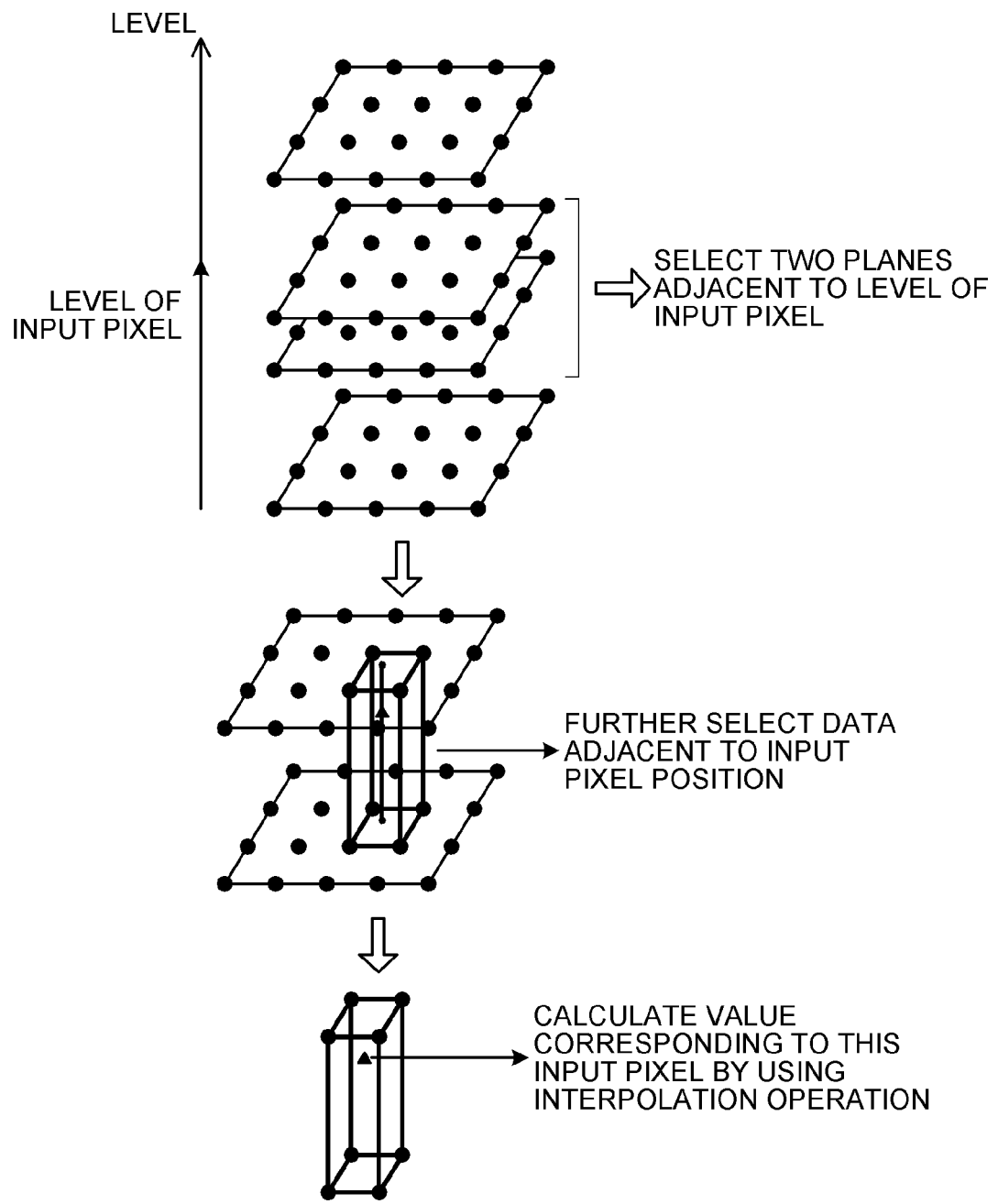
FIG. 7 is a diagram explaining the acquisition of data located close to a target pixel performed by the image processing apparatus.

As illustrated in FIG. 7, when generating the smoothed images of the frames after the (N+1)-th frame, the image processing apparatus 10 refers to the pixels of the frames after the (N+1)-th frame, acquires one or a plurality of pixels of the intermediate smoothed image of the N-th frame corresponding to a position adjacent to each pixel after the (N+1)-th frame from the intermediate smoothed image storing unit 11b, synthesizes the acquired one or plurality of pixels of the intermediate smoothed image of the N-th frame with the pixels of the frames after the (N+1)-th frame of the moving image received from the outside by using the interpolation operation, and generates smoothed images. FIG. 7 is a diagram explaining the acquisition of data located close to a target pixel performed by the image processing apparatus 10.

As a specific example, when generating the smoothed images of the frames after the (N+1)-th frame, the image processing apparatus 10 refers to the level of each input pixel of the frames after the (N+1)-th frame and acquires two planes of the intermediate smoothed images of the N-th frame corresponding to the adjacent position (pixel positions only for the cubic part of FIG. 7) of each pixel after the (N+1)-th frame from the intermediate smoothed image storing unit 11b. Then, the image processing apparatus 10 synthesizes the acquired two planes of the intermediate smoothed images of the N-th frame with the pixels of the frames after the (N+1)-th frame of the moving image received from the outside by using the interpolation operation and generates smoothed images. In this way, because the image processing apparatus 10 acquires a plurality of intermediate smoothed images adjacent to the synthesis position and performs the synthesis process by using the interpolation operation, a high-accuracy smoothed image can be easily generated.

(3) Synthesis Process by Secondary Interpolation

In the first embodiment, it has been explained about the case where the image processing apparatus 10 performs the synthesis process by using the interpolation operation. However, the present invention is not limited to this. The image processing apparatus 10 may perform a synthesis process by using secondary interpolation. For example, when performing a synthesis process by using secondary interpolation, it is only necessary that the image processing apparatus 10 acquire a plurality of planes other than an adjacent plane. As a result, the image processing apparatus 10 can generate a higher-accuracy smoothed image.

(4) Data Required for Synthesis Process

In the third embodiment, it has been explained about the case where the image processing apparatus 10 holds intermediate smoothed images within the range in which images are utilized for a synthesis process. However, the present invention is not limited to this. The image processing apparatus 10 may hold only two-line intermediate smoothed images that are utilized for a synthesis process. As a result, because the image processing apparatus 10 performs a synthesis process by an interpolation operation by using only adjacent data (two lines), data according to the synthesis process can be effectively utilized.

(5) Program

Figure 11:
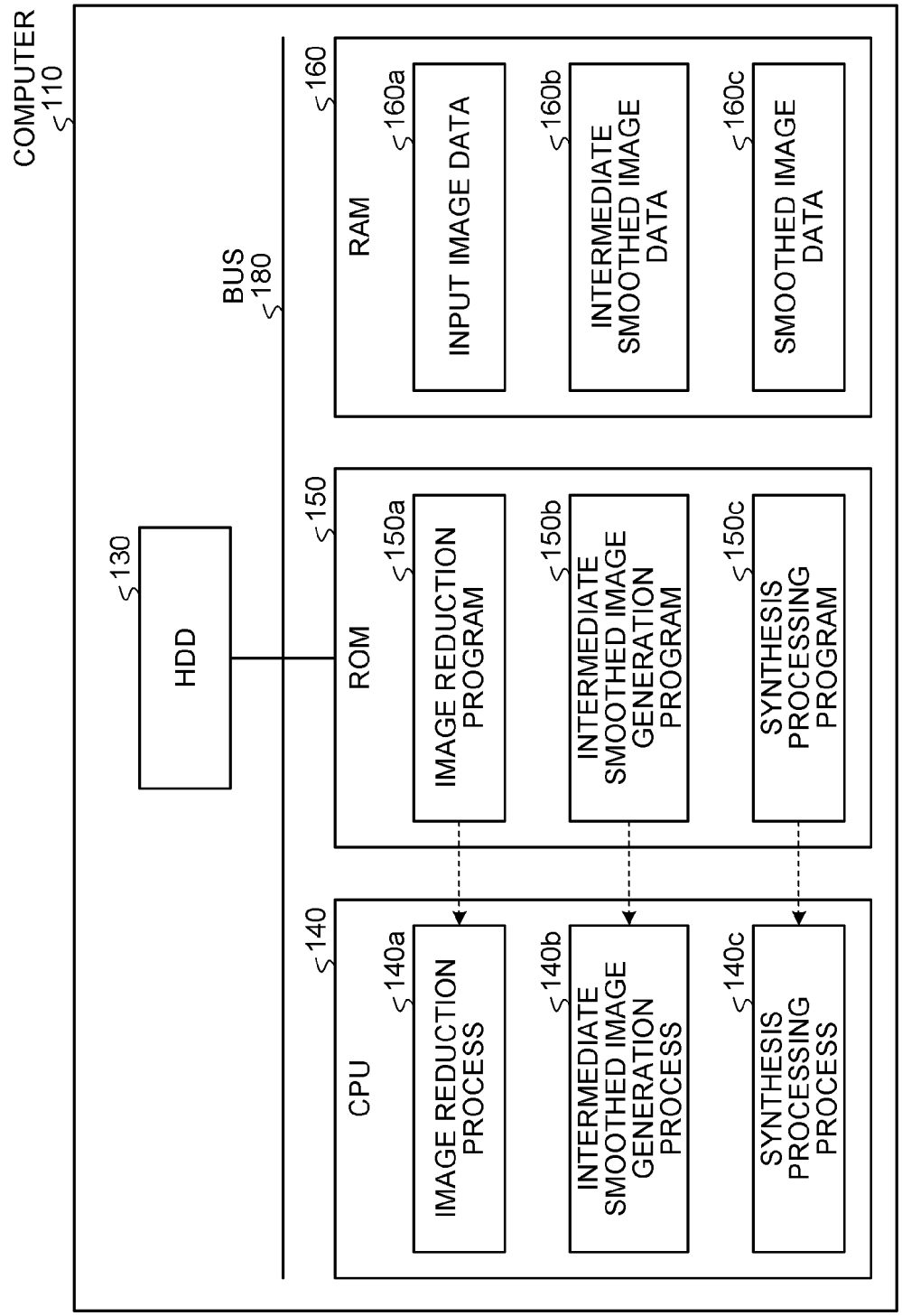
FIG. 11 is a diagram illustrating a computer for executing an image processing program.
Figure 12A:
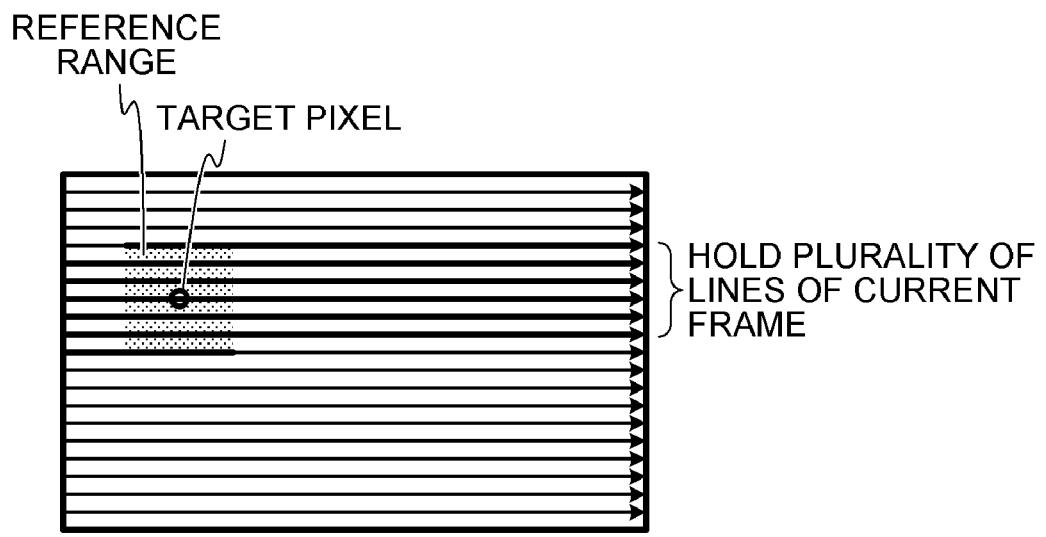
FIGS. 12A and 12B are diagrams explaining a smoothing process according to a conventional art.
Figure 12B:
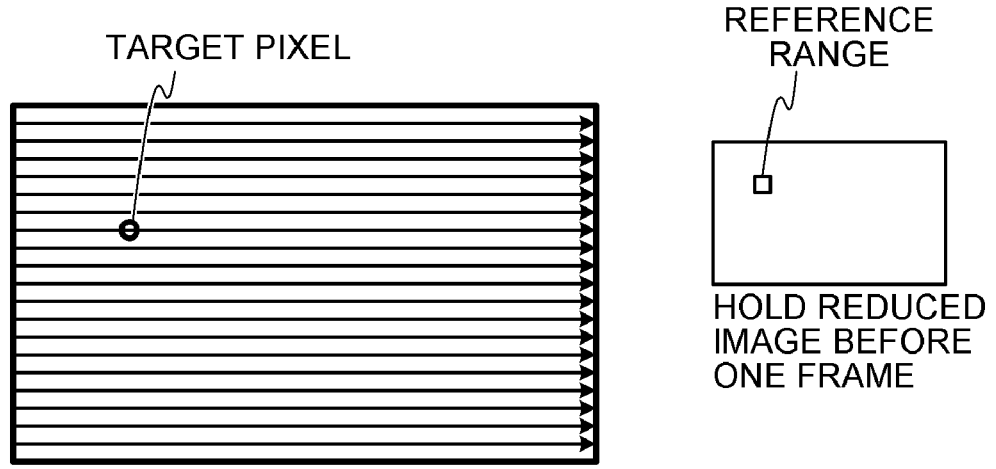

The image processing apparatus explained in the present embodiments can be realized by carrying out a previously-prepared program by using a computer such as a personal computer or a workstation. Therefore, it will be below explained about an example of a computer that executes an image processing program having the same function as that of the image processing apparatus indicated by the embodiments with reference to FIG. 11. FIG. 11 is a diagram illustrating a computer 110 that executes an image processing program.

As illustrated in FIG. 11, the computer 110 that functions as the image processing apparatus includes an HDD 130, a CPU 140, a ROM 150, and a RAM 160 that are connected to each other via a bus 180.

The ROM 150 previously stores therein an image processing program that depicts the same function as that of the image processing apparatus 10 indicated by the first embodiment. In this case, as illustrated in FIG. 11, the image processing program includes an image reduction program 150a, an intermediate smoothed image generation program 150b, and a synthesis processing program 150c. In addition, these programs 150a to 150c may be appropriately integrated or dispersed similarly to each component of the image processing apparatus 10 illustrated in FIG. 2.

The CPU 140 reads out and executes the programs 150a to 150c from the ROM 150. As a result, as illustrated in FIG. 11, the programs 150a to 150c seem to function as an image reduction process 140a, an intermediate smoothed image generation process 140b, and a synthesis processing process 140c. In addition, the processes 140a to 140c respectively correspond to the image reduction processing unit 12b, the intermediate smoothed image generating unit 12c, and the synthesis processing unit 12d as illustrated in FIG. 2.

The CPU 140 executes the image processing program on the basis of an input image data 160a, an intermediate smoothed image data 160b, and a smoothed image data 160c that are recorded in the RAM 160.

The programs 150a to 150c are not necessarily stored in the ROM 150 from the start. For example, the programs may be stored in a "transportable physical medium" such as a flexible disk (FD), CD-ROM, a DVD disc, a magneto-optical disk, or an IC card that is inserted into the computer 110, a "fixed physical medium" such as an HDD that is provided inside and outside the computer 110, or "other computers" (or servers) that are connected to the computer 110 via public lines, Internet, LAN, WAN, or the like and be read out and executed by the computer 110.

As described above, according to an aspect of the present invention, memory capacity required to perform an LPF process can be reduced and edges can be accurately reproduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus for generating a smoothed image by using a low frequency component, the image processing apparatus comprising:
    an intermediate smoothed image holding unit that holds a plurality of intermediate smoothed images that are smoothed at a plurality of preset level values;

an image reduction processing unit that generates a reduced image by reducing an N-th frame image of a received moving image that consists of a plurality of received frames;

an intermediate smoothed image generating unit that generates the plurality of intermediate smoothed images by performing a smoothing process on the reduced image generated by the image reduction processing unit at the plurality of preset level values, and stores the generated intermediate smoothed images in the intermediate smoothed image holding unit;

an acquiring unit that acquires, when generating smoothed images of frames after an (N+1)-th frame, one intermediate smoothed image or a plurality of intermediate smoothed images from the plurality of intermediate smoothed images of the N-th frame held in the intermediate smoothed image holding unit; and a synthesis processing unit that generates smoothed images each of which has size of not being reduced by synthesizing the intermediate smoothed images of the N-th frame which is reduced and the frames each of which is after the (N+1)-th frame of the received moving image and is not reduced.

2. The image processing apparatus according to claim 1, wherein the intermediate smoothed image holding unit holds only intermediate smoothed images within a predetermined range utilized by the synthesis processing unit among the plurality of intermediate smoothed images generated by the intermediate smoothed image generating unit, the intermediate smoothed image generating unit acquires position information of pixels in the frames after the (N+1)-th frame of the received moving image, computes pixel positions of the reduced image of the N-th frame corresponding to the position information, performs the smoothing process on the reduced image generated by the image reduction processing unit at the plurality of preset level values within a predetermined range including the computed pixel positions, generates the plurality of intermediate smoothed images, and stores the generated intermediate smoothed images in the intermediate smoothed image holding unit, and the synthesis processing unit synthesizes the intermediate smoothed images of the N-th frame acquired by the acquiring unit with the frames after the (N+1)-th frame of the moving image received from the outside, generates the smoothed images, and destroys a part or a whole of the plurality of intermediate smoothed images that is utilized for the synthesis and is stored in the intermediate smoothed image holding unit.

3. The image processing apparatus according to claim 1, wherein the synthesis processing unit refers to, when synthesizing the plurality of intermediate smoothed images of the N-th frame acquired by the acquiring unit with the frames after the (N+1)-th frame, the frames after the (N+1)-th frame, computes synthesis ratios from differences with the plurality of preset level values, synthesizes the plurality of intermediate smoothed images of the N-th frame with the frames after the (N+1)-th frame of the received moving image by using an interpolation operation on the basis of the computed synthesis ratios, to generate the smoothed images.

4. The image processing apparatus according to claim 1, wherein the acquiring unit refers to, when generating the smoothed images of the frames after the (N+1)-th frame, pixels of the frames after the (N+1)-th frame and acquires one or a plurality of pixels of the intermediate smoothed images of the N-th frame corresponding to adjacent positions of pixels after the (N+1)-th frame from the intermediate smoothed image holding unit, and the synthesis processing unit refers to, when synthesizing the one or the plurality of pixels of the plurality of intermediate smoothed images of the N-th frame acquired by the acquiring unit with the frames after the (N+1)-th frame, the frames after the (N+1)-th frame, computes synthesis ratios from differences with the plurality of preset level values, synthesizes the one or the plurality of pixels of the intermediate smoothed images of the N-th frame with the pixels of the frames after the (N+1)-th frame of the received moving image by using an interpolation operation on the basis of the computed synthesis ratios, and generates the smoothed images.

5. The image processing apparatus according to claim 2, wherein the intermediate smoothed image holding unit holds only adjacent two-line intermediate smoothed images including pixels of the frames after the (N+1)-th frame in the N-th frame utilized by the synthesis processing unit among the plurality of intermediate smoothed images generated by the intermediate smoothed image generating unit, the intermediate smoothed image generating unit acquires position information of pixels in the frames after the (N+1)-th frame of the received moving image for the reduced image generated by the image reduction processing unit, computes pixel positions of the reduced image of the N-th frame corresponding to the position information, performs the smoothing process on the two lines including the computed pixel positions at the plurality of preset level values, generates the plurality of intermediate smoothed images, and stores the generated intermediate smoothed images in the intermediate smoothed image holding unit, and the synthesis processing unit refers to, when synthesizing one or a plurality of pixels of the plurality of intermediate smoothed images of the N-th frame acquired by the acquiring unit with the frames after the (N+1)-th frame, the frames after the (N+1)-th frame, computes synthesis ratios from differences with the plurality of preset level values, synthesizes the one or the plurality of pixels of the intermediate smoothed images of the N-th frame with the pixels of the frames after the (N+1)-th frame of the moving image received from the outside by using an interpolation operation on the basis of the computed synthesis ratios, generates the smoothed images, and destroys a part or a whole of the plurality of intermediate smoothed images that is utilized for the synthesis and is stored in the intermediate smoothed image holding unit.

6. A non-transitory computer readable storage medium having stored therein an image processing program for generating a smoothed image by using a low frequency component, the image processing program causing a computer to execute a process comprising:

holding a plurality of intermediate smoothed images that are smoothed at a plurality of preset level values;

generating a reduced image by reducing an N-th frame image of a received moving image that consist of a plurality of received frames;

generating the plurality of intermediate smoothed images by performing a smoothing process on the generated reduced image at the plurality of preset level values;

storing the generated intermediate smoothed images at the holding;

acquiring, when generating smoothed images of frames after an (N+1)-th frame, one intermediate smoothed image or a plurality of intermediate smoothed images from the plurality of intermediate smoothed images of the N-th frame held at the holding; and generating smoothed images each of which has size of not being reduced by synthesizing the intermediate smoothed images of the N-th frame which is reduced and the frames each of which is after the (N+1)-th frame of the received moving image and is not reduced.

7. The non-transitory computer readable storage medium according to claim 6, wherein the holding includes holding only intermediate smoothed images within a predetermined range utilized at the generating the smoothed images among the plurality of intermediate smoothed images generated at the generating the plurality of intermediate smoothed images, the generating the plurality of intermediate smoothed images includes acquiring position information of pixels in the frames after the (N+1)-th frame of the received moving image for the reduced image generated at the generating the reduced image, computing pixel positions of the reduced image of the N-th frame corresponding to the position information, performing the smoothing process on a predetermined range including the computed pixel positions at the plurality of preset level values, generating the plurality of intermediate smoothed images, and storing the generated intermediate smoothed images at the holding, and the generating the smoothed images includes generating the smoothed images by synthesizing the intermediate smoothed images of the N-th frame acquired at the acquiring and the frames after the (N+1)-th frame of the received moving image, and destroying a part or a whole of the plurality of intermediate smoothed images that is utilized for the synthesis and is stored at the holding.

8. An image processing method for generating a smoothed image by using a low frequency component, the image processing method comprising:

holding a plurality of intermediate smoothed images that are smoothed at a plurality of preset level values;

generating a reduced image by reducing an N-th frame image of a received moving image that consists of a plurality of received frames;

generating the plurality of intermediate smoothed images by performing a smoothing process on the generated reduced image at the plurality of preset level values;

storing the generated intermediate smoothed images at the holding;

acquiring, when generating smoothed images of frames after an (N+1)-th frame, one intermediate smoothed image or a plurality of intermediate smoothed images from the plurality of intermediate smoothed images of the N-th frame held at the holding; and generating smoothed images each of which has size of not being reduced by synthesizing the intermediate smoothed images of the N-th frame which is reduced and the frames after the (N+1)-th frame of the received moving image and is not reduced.

9. The image processing method according to claim 8, wherein the holding includes holding only intermediate smoothed images within a predetermined range utilized at the generating the smoothed images among the plurality of intermediate smoothed images generated at the generating the plurality of intermediate smoothed images, the generating the plurality of intermediate smoothed images includes acquiring position information of pixels in the frames after the (N+1)-th frame of the received moving image for the reduced image generated at the generating the reduced image, computing pixel positions of the reduced image of the N-th frame corresponding to the position information, performing the smoothing process on a predetermined range including the computed pixel positions at the plurality of preset level values, generating the plurality of intermediate smoothed images, and storing the generated intermediate smoothed images at the holding, and the generating the smoothed images includes generating the smoothed images by synthesizing the intermediate smoothed images of the N-th frame acquired at the acquiring and the frames after the (N+1)-th frame of the received moving image, and destroying a part or a whole of the plurality of intermediate smoothed images that is utilized for the synthesis and is stored at the holding.

\* \* \* \* \*